United States Patent
Esenlik et al.

(10) Patent No.: US 11,736,718 B2
(45) Date of Patent: Aug. 22, 2023

(54) SEARCH REGION FOR MOTION VECTOR REFINEMENT

(71) Applicant: Huawei Technologies Co., Ltd., Shenzhen (CN)

(72) Inventors: Semih Esenlik, Munich (DE); Anand Meher Kotra, Munich (DE); Zhijie Zhao, Shenzhen (CN); Han Gao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 17/349,557

(22) Filed: Jun. 16, 2021

(65) Prior Publication Data

US 2021/0314604 A1  Oct. 7, 2021

Related U.S. Application Data

(63) Continuation of application No. 16/730,823, filed on Dec. 30, 2019, now Pat. No. 11,082,714, which is a
(Continued)

(51) Int. Cl.
  *H04N 19/56* (2014.01)
  *H04N 19/513* (2014.01)
  *H04N 19/55* (2014.01)

(52) U.S. Cl.
  CPC ........... *H04N 19/56* (2014.11); *H04N 19/521* (2014.11); *H04N 19/55* (2014.11)

(58) Field of Classification Search
  None
  See application file for complete search history.

(56) References Cited

U.S. PATENT DOCUMENTS 5,742,710 A   4/1998  Hsu et al.
6,968,008 B1  11/2005 Ribas-Corbera et al.
(Continued)

FOREIGN PATENT DOCUMENTS

CN  101247523 A   8/2008
CN  102263947 A  11/2011
(Continued)

OTHER PUBLICATIONS

U.S. Appl. No. 16/730,823, filed Dec. 30, 2019.
(Continued)

*Primary Examiner* — Clifford Hilaire
(74) *Attorney, Agent, or Firm* — Leydig, Voit & Mayer, Ltd.

(57) ABSTRACT

The embodiments disclosed herein relate to the construction of a search space for determining a motion vector for a current block of a picture in a video sequence. The search space construction is split into in two main stages, wherein a first and a second partial search space are respectively determined. Based on an initial estimate of a motion vector, a first search space is first constructed. A first and a second candidate motion of the first search space are identified according to a cost function. Based on the first and the second candidate motion vectors, a second search space is constructed. The motion vector for the current block is selected from the candidate motion vectors of the first search space and the second search space.

16 Claims, 13 Drawing Sheets

Related U.S. Application Data continuation of application No. PCT/EP2017/066337, filed on Jun. 30, 2017.

(56) References Cited

U.S. PATENT DOCUMENTS

| | | | |
|---|---|---|---|
| 6,996,180 | B2 | 2/2006 | Kim et al. |
| 2004/0252766 | A1 | 12/2004 | Lee et al. |
| 2005/0207663 | A1* | 9/2005 | Zeng .................. H04N 19/523 |
| | | | 375/E7.113 |
| 2010/0118959 | A1 | 5/2010 | Lou et al. |
| 2012/0106627 | A1 | 5/2012 | Guo et al. |
| 2012/0128059 | A1 | 5/2012 | Chuang et al. |
| 2014/0153844 | A1 | 6/2014 | Jeon et al. |
| 2015/0195562 | A1 | 7/2015 | Li et al. |
| 2016/0173905 | A1 | 6/2016 | Lin et al. |
| 2017/0180753 | A1 | 6/2017 | Kim et al. |
| 2019/0007699 | A1 | 1/2019 | LIU et al. |

FOREIGN PATENT DOCUMENTS

| | | |
|---|---|---|
| CN | 102316323 A | 1/2012 |
| CN | 103339935 A | 10/2013 |
| CN | 106878737 A | 6/2017 |
| EP | 1073276 A2 | 1/2001 |
| JP | 2001189934 A | 7/2001 |
| JP | 2008177630 A | 7/2008 |
| JP | 2009290295 A | 12/2009 |
| WO | 2008016605 A2 | 2/2008 |
| WO | 2008127568 A2 | 10/2008 |
| WO | 2010151334 A1 | 12/2010 |
| WO | 2016160605 A1 | 10/2016 |

OTHER PUBLICATIONS

Chen et al., "Decoder-Side Motion Vector Refinement Based on Bilateral Template Matching," Joint Video Exploration Team (JVET) of ITU-T SG16 WP3 and ISO/IEC JTC1/SC29/WG11, 4th Meeting: Chengdu, CN, JVET-D0029, pp. 1-4, International Telecommunication Union, Geneva, Switzerland (Oct. 15-21, 2016).

Chen et al., "Algorithm Description of Joint Exploration Test Model 1," Joint Video Exploration Team (JVET) of ITU-T SG16 WP3 and ISO/IEC JTC1/SC29/WG11, 1st Meeting: Geneva, CH, JVET-A1001, pp. 1-27, International Telecommunication Union, Geneva, Switzerland (Oct. 19-21, 2015).

"Series H: Audiovisual and Multimedia Systems Infrastructure of audiovisual services—Coding of moving video, High efficiency video coding," Recommendation of ITU-T H.265, ITU-T Telecommunication Standardization Sector of ITU, H.265, pp. 1-664, International Telecommunication Union, Geneva, Switzerland (Dec. 2016).

"Series H: Audiovisual and Multimedia Systems, Infrastructure of audiovisual services—Coding of moving video, Advanced video coding for generic audiovisual services," Recommendation of ITU-T H.264, ITU-T Telecommunication Standardization Sector of ITU, H. 264, pp. 1-812, International Telecommunication Union, Geneva Switzerland (Apr. 2017).

Chen et al., "Algorithm Description of Joint Exploration Test Model 6 (JEM 6)," Joint Video Exploration Team (JVET) of ITU-T SG 16 WP 3 and ISO/IEC JTC 1/SC 29/WG 11, 6th Meeting: Hobart, AU, Document: JVET-F1001-v2, total 50 pages (Mar. 31-Apr. 7, 2017).

C. Rosewarne et al.,"High Efficiency Video Coding (HEVC) Test Model 16 (HM 16) Improved Encoder Description Update 3," Joint Collaborative Team on Video Coding (ICT-VC) of ITU-T SG16 WP3 and ISO/IEC JTC1/SCZ9/W G11, 21st Meeting: Warsaw, PL, Document: JCTVC-U1002, XP30241850, total 58 pages (Jun. 19-26, 2015).

Rosewarne et al., "High Efficiency Video Coding (HEVC) Test Model 16 (HM 16) Improved Encoder Description Update 4," Joint Collaborative Team on Video Coding (JCT-VC) of ITU-T SG16 WP3 and ISO/IEC JTC1/SC29/WG11, 22nd Meeting: Geneva, CH, Document: JCTVC-V1002, total 62 pages (Oct. 15-21, 2015).

Sze et al., "High Efficiency Video Coding (HEVC): Algorithms and Architectures," Integrated Circuits and Systems, Total 384 pages, Springer International Publishing Switzerland (2014).

* cited by examiner

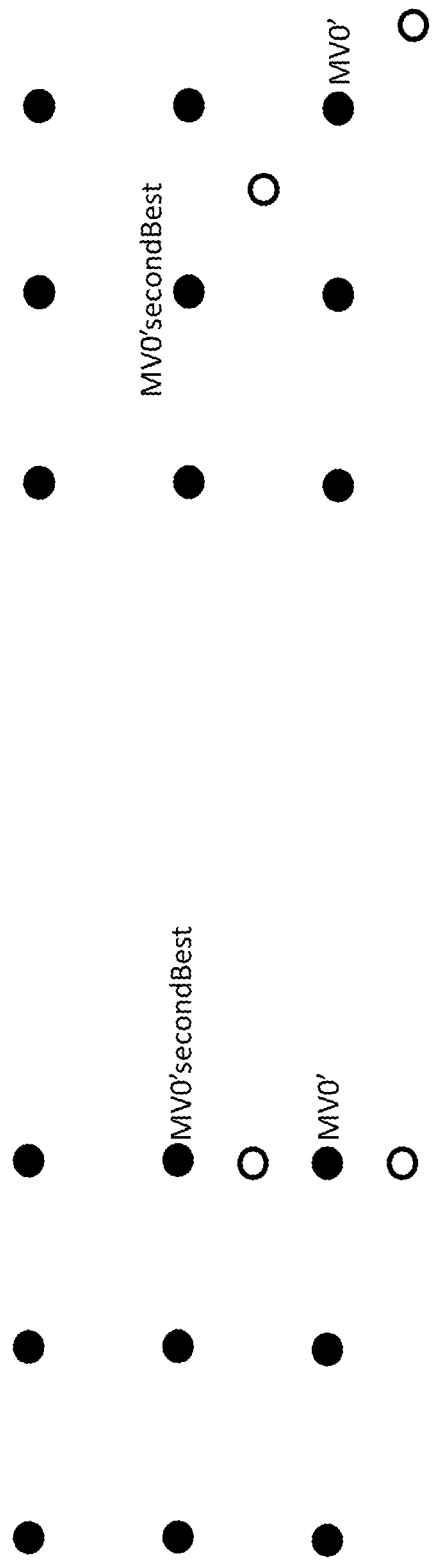

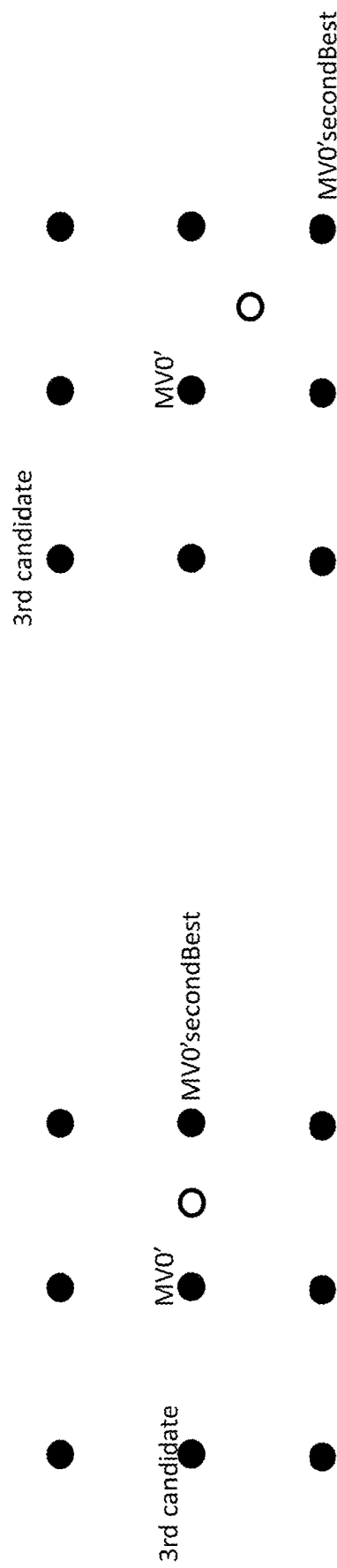

SEARCH REGION FOR MOTION VECTOR REFINEMENT

CROSS-REFERENCE TO RELATED APPLICATIONS

This application is a continuation of U.S. patent application Ser. No. 16/730,823, filed on Dec. 30, 2019, which is a continuation of International Application No. PCT/EP2017/066337, filed on Jun. 30, 2017. All of the afore-mentioned patent applications are hereby incorporated by reference in their entireties.

BACKGROUND

Current hybrid video codecs employ predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed (e.g., by means of quantization) and further compacted (e.g., by entropy coding) to form a bitstream. The bitstream can further include any signaling information which enables the decoder to decode the encoded video. For instance, the signaling may include settings concerning the encoder settings such as size of the input picture, frame rate, quantization step indication, prediction applied to the blocks of the pictures, or the like.

The differences between a block and its prediction are known as the residual of the block. More specifically, each pixel of the block has a residual, which is the difference between an intensity level of that pixel and its predicted intensity level. The intensity level of a pixel is referred to as the pixel value or value of the pixel. The residuals of all the pixels of a block are referred to collectively as the residual of the block. In other words, the block has a residual which is a set or matrix consisting of the residuals of all the pixels of the block.

Temporal prediction exploits temporal correlation between pictures, also referred to as frames, of a video. The temporal prediction is also called inter-prediction, as it is a prediction using the dependencies between (inter) different video frames. Accordingly, a block to be decoded, also referred to as a current block, is predicted from one or more previously decoded pictures referred to as reference pictures. The one or more reference pictures are not necessarily pictures preceding the current picture in which the current block is located in the displaying order of the video sequence. The encoder may encode the pictures in a coding order different from the displaying order. As a prediction of the current block, a co-located block (referred to as a predictor) in a reference picture may be determined. The co-located block may be located in the reference picture on the same position as the current block in the current picture. Such prediction is accurate for motionless picture regions, i.e. picture regions without movement from one picture to another.

In the encoder, in order to obtain a predictor which takes movement into account, i.e. a motion compensated predictor, motion estimation is typically employed. The current block is predicted by a block located in the reference picture at a position indicated by a motion vector. The motion vector points from the position of the co-located block to the position of the current block (or vice versa, depending on the sign convention). In order to enable a decoder to determine the same prediction of the current block as the encoder, the motion vector may be signaled in the bitstream. In order to further reduce the signaling overhead caused by signaling the motion vector for each of the blocks, the motion vector itself may be estimated. The motion vector estimation may be performed based on the motion vectors of blocks which are neighbors of the current block in spatial and/or temporal domain.

The prediction of the current block may be computed using one reference picture or by weighting predictions obtained from two or more reference pictures. The reference picture may be an adjacent picture, i.e. a picture immediately preceding or immediately following the current picture in the display order since adjacent pictures are most likely to be similar to the current picture. However, in general, the reference picture may be any picture preceding or following the current picture in the displaying order and preceding the current picture in the bitstream (decoding order). This may provide advantages for instance in case of occlusions and/or non-linear movement in the video content. The reference picture may therefore be signaled in the bitstream.

A special mode of the inter-prediction is a so-called bi-prediction in which two reference pictures are used in generating the prediction of the current block. In particular, two predictions determined in the respective two reference pictures are combined into a prediction signal of the current block. The bi-prediction can result in a more accurate prediction of the current block than the uni-prediction, i.e. prediction only using a single reference picture. The more accurate prediction leads to smaller differences between the pixels of the current block and the prediction (i.e. to smaller residuals), which may be encoded more efficiently, i.e. compressed to a shorter bitstream.

In order to provide more accurate motion estimation, the resolution of the reference picture may be enhanced, for example, by interpolating samples between pixels. Fractional pixel interpolation can be performed by weighted averaging of the closest pixels. For example, in case of half-pixel resolution, a bilinear interpolation can be used. Other fractional pixels can be calculated as an average of the closest pixels weighted by, for example, the inverse of the distance between the respective closest pixels to the pixel being predicted.

A motion vector can be estimated, for example, by calculating a similarity between the current block and the corresponding prediction blocks pointed to by candidate motion vectors in the reference picture. This can be a complex computational task. In order to reduce the complexity, the number of candidate motion vectors can be reduced by limiting the candidate motion vectors to a certain search space. The search space may be, for instance, defined by a number and/or positions of pixels surrounding the position in the reference picture corresponding to the position of the current block in the current image. Alternatively, the candidate motion vectors may be defined by a list of candidate motion vectors formed of motion vectors of neighboring blocks.

Motion vectors are usually at least partially determined at the encoder side and signaled to the decoder within the coded bitstream. However, the motion vectors may also be derived at the decoder. In such case, the current block is not available at the decoder and cannot be used for calculating the similarity between the current block and any of the blocks to which the candidate motion vectors point in the reference picture. Therefore, instead of the current block, a template can be used which can be constructed out of pixels of already decoded blocks. For instance, already decoded pixels adjacent to the current block may be used. Such motion estimation provides an advantage of reducing the signaling: the motion vector is derived in the same way at both the encoder and the decoder and thus, no signaling is needed. On the other hand, the accuracy of such motion estimation may be lower.

In order to provide a tradeoff between the accuracy and signaling overhead, the motion vector estimation may be divided into two steps: motion vector derivation and motion vector refinement. For instance, a motion vector derivation may include selection of a motion vector from the list of candidates. The selected motion vector may be further refined, for instance, by a search within a search space. The search in the search space is based on calculating a cost function for each candidate motion vector, i.e. for each candidate position of the block to which the candidate motion vector points.

Document JVET-D0029: Decoder-Side Motion Vector Refinement Based on Bilateral Template Matching, X. Chen, J. An, J. Zheng (The document can be found at: http://phenix.it-sudparis.eu/jvet/) shows motion vector refinement in which a first motion vector in integer pixel resolution is found and further refined by a search with a half-pixel resolution in a search space around the first motion vector. Here, the pixel resolution (e.g., integer or half-integer) describes the resolution of the search space, i.e. the displacement of the searched points to the non-refined motion vector that is input to the process. As a result the search coordinates of the refinement stage do not necessarily coincide with the actual pixel coordinates on the image plane.

SUMMARY

Starting from the above described approaches, it is an aim of the present disclosure to further increase the efficiency of the motion vector estimation in order to improve the coding efficiency and/or reduce complexity.

In order to achieve this, a scheme for constructing a search space for motion vector refinement is provided, involving a first search space and a second search space. The number of positions and/or the positions of the second search space is determined according to two positions in the first search space which are derived based on a cost function.

In particular, according to a first aspect, an apparatus for determining a motion vector to be used in inter-prediction of a current block of a video frame is provided. The apparatus comprises a search space determining unit for obtaining an estimate of the motion vector and determining a first search space comprising a plurality of candidate motion vectors based on the estimate, selecting a first and a second candidate motion vector in the first search space according to a cost function, and determining a second search space comprising one or more candidate motion vectors based on the first and the second candidate motion vectors. The apparatus further comprises a motion vector selecting unit for selecting the motion vector for the current block from among the candidate motion vectors of the first search space and the search second space.

As an advantage, the number of candidate motion vectors tested in the process of motion vector refinement on the decoder side may be reduced while maintaining a high quality coding performance with respect to picture quality and bitrate.

Advantageously, the cost function is based on a predetermined template and indicates, for the respective candidate motion vector, a level of similarity between the predetermined template and a predictor pointed to by the respective candidate motion vector. The search space determining unit is thus configured to select, as the first and the second candidate motion vectors, two candidate motion vectors in the first search space which point to predictors of the current block that are most similar to the predetermined template.

According to a first embodiment, the search space determining unit is further configured to determine the size and/or the position of the second search space in accordance with a direction of a line connecting the positions pointed to by the first and the second candidate motion vectors; in other words, in accordance with the direction of a difference vector of the first and the second candidate motion vectors. The difference vector can be defined as the first candidate motion vector subtracted from the second candidate motion vector, or vice versa.

For instance, the search space determining unit is further configured to set the first search space to have an integer pixel resolution. The search space determining unit is configured to include in the second search space one or more candidate motion vectors which point to positions located in the direction of a line connecting the positions to which the first and the second candidate motion vectors point, the second search space having a fractional pixel resolution. The direction of that line is, in other words, the direction of the difference vector of the first and the second candidate motion vectors.

As an example, at least one of the candidate motion vectors of the second search space points to a position between positions pointed to by the first and the second candidate motion vectors.

According to a second embodiment, the search space determining unit is configured to determine a location of a region including at least two positions to which at least two candidate motion vectors point respectively, said at least two positions being adjacent in a pixel resolution of the second search space, and to determine the second search space as those positions of the region which do not belong to the first search space.

For instance, the search space determining unit may be configured to determine the first search space including the estimate of the motion vector and candidate motion vectors pointing to the positions adjacent in a pixel resolution of the first search space to the position pointed to by said estimate of the motion vector.

According to a third embodiment, the search space determining unit is further configured to determine as a first candidate motion vector of the second search space the candidate motion vector pointing to the position which is adjacent in the pixel resolution of the first search space to the positions pointed to by the first and the second candidate motion vectors identified in the first search space and different from the position pointed to by the estimate of the motion vector.

For instance, the search space determining unit is further configured to select as a further candidate motion vector of the second search space a candidate motion vector pointing to a position in a resolution of the second search space, which is located approximately on a line connecting the estimate of the motion vector and the candidate of the second search space, the pixel resolution of the second search space being higher than the pixel resolution of the first search space.

As an example, the further candidate motion vector of the second search space points to a position located between the positions pointed to by the first candidate motion vector of the second search space and the estimate of the motion vector.

As an example of all embodiments of the first aspect, the second search space has a higher resolution than the first search space.

As a further example, the apparatus further comprises a motion vector determining unit for determining the estimate of the motion vector from a list of motion vectors including motion vectors of at least one block adjacent to the current block.

Further provided is a video decoder for decoding a plurality of pictures from a bitstream. The video decoder comprises a bitstream parser for obtaining from the bitstream an indication of the estimate of the motion vector, an inter-prediction unit including the apparatus according to any embodiment and example of the first aspect, which is further configured to determine a prediction block to which the motion vector of the current block points, and a reconstruction unit for reconstructing the current block based on the prediction block.

Also provided is a video encoder for encoding a plurality of pictures into a bitstream. The video encoder comprises an inter-prediction unit including the apparatus according to any embodiment and example of the first aspect which is further configured to determine a prediction block to which the motion vector of the current block points, a bitstream former for including into the bitstream an indication of the estimate of the motion vector, and a reconstruction unit for reconstructing the current block based on the prediction block and storing the reconstructed block in a memory.

According to a second aspect, a method is provided for determining a motion vector to be used in inter-prediction of a current block. The method comprises the steps of obtaining an estimate of the motion vector, determining a first search space comprising a plurality of candidate motion vectors based on the estimate, selecting a first and a second candidate motion vector in the first search space according to a cost function, determining a second search space comprising one or more candidate motion vectors based on the first and the second candidate motion vector, and selecting the motion vector for the current block from among the candidate motion vectors of the first space and the second space.

Advantageously, the cost function is based on a predetermined template and indicates, for the respective candidate motion vector, a level of similarity between the predetermined template and a predictor pointed to by the respective candidate motion vector. Selecting the first and the second candidate motion vector thus comprises selecting two candidate motion vectors in the first search space which point to predictors of the current block that are most similar to the predetermined template.

In a first exemplary embodiment, in the step of determining the second search space, the size and/or position of the second search space are determined in accordance with a direction of a line connecting the positions to which the first and the second candidate motion vectors point.

As an example, in the step of determining the first search space including a plurality of candidate motion vectors, the first search space has an integer pixel resolution. In the step of determining the second search space, the is determined as one or more candidate motion vectors pointing to positions located in the direction of a line connecting the positions to which the first and the second candidate motion vectors point, the second search space having a fractional pixel resolution.

For instance, at least one of the candidate motion vectors of the second search space points to a position between positions pointed to by the first and the second candidate motion vectors.

According to a second exemplary embodiment, in the step of determining the second search space, a location of a region including at least two positions to which at least two candidate motion vectors point respectively is determined, said at least two positions being adjacent in a pixel resolution of the second search space, and the second search space is determined as those positions of the region which do not belong to the first search space. As an example, in the step for determining the first search space, the first search space includes the estimate of the motion vector and candidate motion vectors pointing to the positions adjacent in a pixel resolution of the first search space to the position pointed to by said estimate of the motion vector.

According to a third exemplary embodiment, in the step of determining the second search space, as a first candidate motion vector of the second search space, a candidate motion vector is determined which points to a position which is adjacent in the pixel resolution of the first search space to the positions pointed to by the first and the second candidate motion vectors identified in the first search space and different from the position pointed to by the estimate of the motion vector.

For instance, as a further example of at least one candidate motion vector of the second search space, a candidate motion vector is determined which points to a position in a resolution of the second search space, which is located approximately on a line connecting the estimate of the motion vector and the candidate of the second search space. Therein, the pixel resolution of the second search space is higher than the pixel resolution of the first search space.

As an example, said further candidate motion vector of the second search space points to a position located between the positions pointed to by the first candidate motion vector of the second search space and the estimate of the motion vector.

As an example of all embodiments of the second aspect, the second search space has a higher resolution than the first search space.

As a further example, the step of obtaining the estimate of the motion vector is performed by determining the estimate of the motion vector from a list of motion vectors including motion vectors of at least one block adjacent to the current block.

BRIEF DESCRIPTION OF THE DRAWINGS

In the following exemplary embodiments are described in more detail with reference to the attached figures and drawings, in which:

FIGS. 5 to 8 are schematic drawings of search space configurations according to a first exemplary embodiment.

FIGS. 10 and 11 are schematic drawings of further search space configurations according to a first embodiment.

DETAILED DESCRIPTION OF THE EMBODIMENTS

The present disclosure relates to an efficient determination of a search space for motion compensation and is particularly advantageous for motion vector refinement. The determination of the search space may be employed in motion estimation applied during encoding and decoding of video. In the following, an exemplary encoder and decoder which may implement the motion estimation employing the search space construction of the present disclosure are described.

Figure 1:
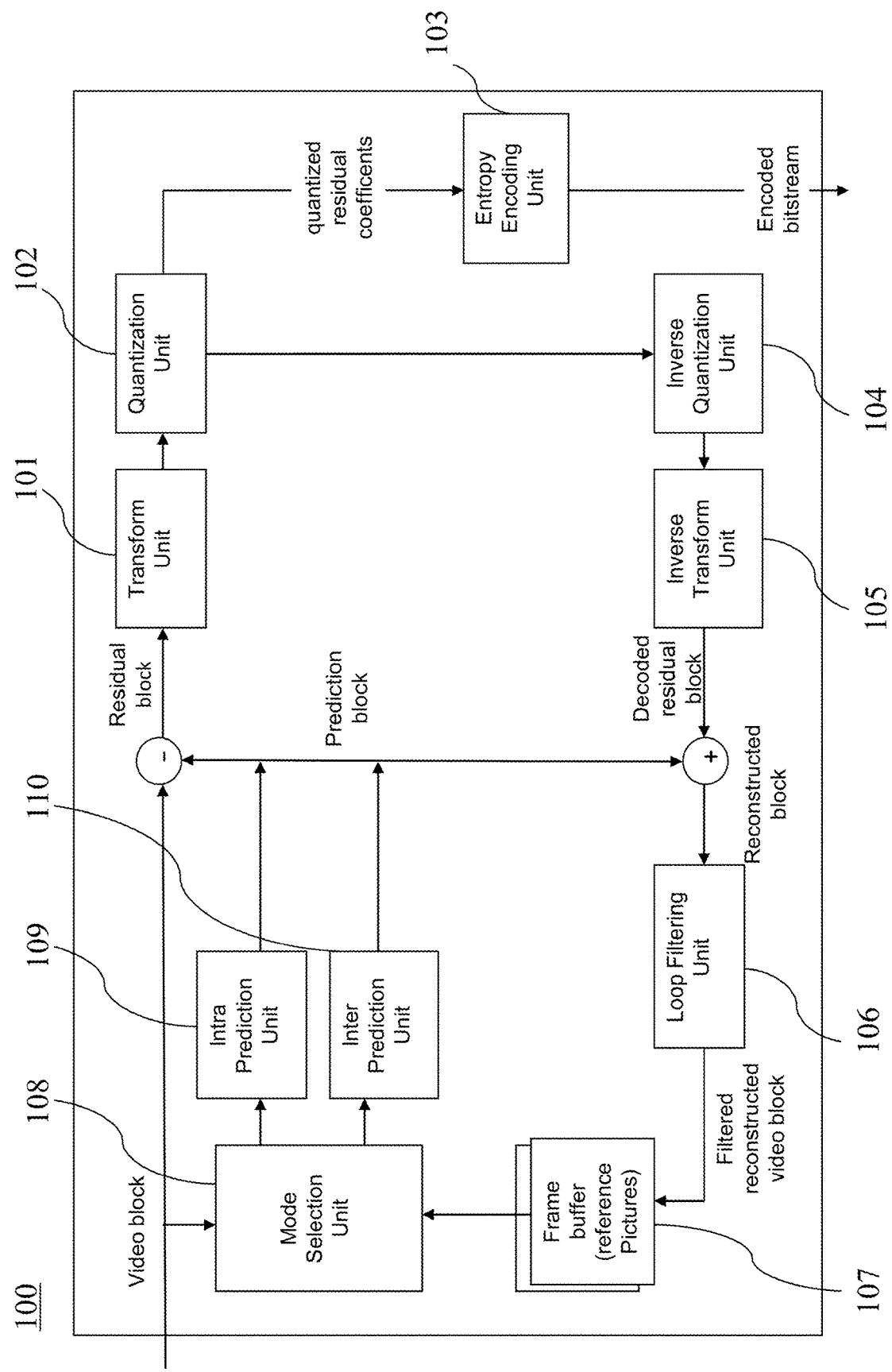
FIG. 1 is a block diagram showing an exemplary structure of a video encoder.

FIG. 1 shows an encoder 100 which comprises an input for receiving input blocks of frames or pictures of a video stream and an output for providing an encoded video bitstream. The term "frame" in this disclosure is used as a synonym for picture. However, it is noted that the present disclosure is also applicable to fields in case interlacing is applied. In general, a picture includes m times n pixels. These correspond to image samples and may each comprise one or more color components. For the sake of simplicity, the following description refers to pixels meaning samples of luminance. However, it is noted that the motion vector search of the disclosure can be applied to any color component including chrominance or components of a color space such as RGB or the like. On the other hand, it may be beneficial to perform motion vector estimation for only one component and to apply the determined motion vector to more (or all) components.

The input blocks to be coded do not necessarily have the same size. One picture may include blocks of different sizes and the block rasters of different pictures may also differ.

The encoder 100 is configured to apply prediction, transformation, quantization, and entropy coding to the video stream. The transformation, quantization, and entropy coding are carried out respectively by a transform unit 101, a quantization unit 102 and an entropy encoding unit 103 so as to generate as an output the encoded video bitstream.

The video stream may include a plurality of frames. Each frame is divided into blocks that are either intra or inter coded. The blocks of, for example, the first frame of the video stream are intra coded by means of an intra prediction unit 109. An intra frame is coded using information from that frame only, so that it can be decoded independently from other frames. An intra frame can thus provide an entry point in the bitstream, e.g., for random access. Blocks of other frames of the video stream may be inter coded by means of an inter prediction unit 110: each block of an inter-coded frame is predicted from a block in another frame (reference frame), e.g., a previously coded frame. A mode selection unit 108 is configured to select whether a block of a frame is to be intra predicted or inter predicted, i.e. whether it will be processed by the intra prediction unit 109 or the inter prediction unit 110. The mode selection unit 108 also controls the parameters of intra of inter prediction. In order to enable refreshing of the image information, an inter coded frame may comprise not only inter coded blocks, but also one or more intra coded blocks. Intra frames, in contrast, contain only intra coded and no inter coded blocks. Intra frames may be inserted in the video sequence (e.g., at regular intervals, that is, each time after a certain number of inter frames) in order to provide entry points for decoding, i.e. points where the decoder can start decoding without using information from preceding frames.

The intra prediction unit 109 is a block prediction unit. For performing spatial or temporal prediction, the coded blocks may be further processed by an inverse quantization unit 104, and an inverse transform unit 105. After reconstruction of the block a loop filtering unit 106 may be applied to further improve the quality of the decoded image. The filtered blocks then form the reference frames that are then stored in a frame buffer 107. Such decoding loop (decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding the decoded residual block to the prediction block.

The inter prediction unit 110 receives as an input a block of a current frame or picture to be inter coded and one or several reference frames or pictures from the frame buffer 107. Motion estimation and motion compensation are performed by the inter prediction unit 110. The motion estimation is used to obtain a motion vector and a reference frame, e.g., based on a cost function. The motion compensation then describes a current block of the current frame in terms of the translation of a reference block of the reference frame to the current frame, i.e. by a motion vector. The inter prediction unit 110 selects a prediction block (i.e. a predictor) for the current block from among a set of candidate blocks (i.e. candidate predictors) in the one or several reference frames such that the prediction block minimizes the cost function. In other words, a candidate block for which the cost function is minimum will be used as the prediction block for the current block.

For instance, the cost function may be a measure of a difference between the current block and the candidate block, i.e. a measure of the residual of the current block with respect to the candidate block. For example, the cost function may be a sum of absolute differences (SAD) between all pixels (samples) of the current block and all pixels of the candidate block in the candidate reference picture. However, in general, any similarity metric may be employed, such as mean square error (MSE) or structural similarity metric (SSIM).

However, the cost function may also be the number of bits that are necessary to code such inter-block and/or distortion resulting from such coding. Thus, a rate-distortion optimization procedure may be used to decide on the motion vector selection and/or in general on the encoding parameters such as whether to use inter or intra prediction for a block and with which settings.

The intra prediction unit 109 receives as an input a block of a current frame or picture to be intra coded and one or several reference samples from an already reconstructed area of the current frame. The intra prediction then describes pixels of a current block of the current frame in terms of a function of reference samples of the current frame. The intra prediction unit 109 outputs a prediction block for the current block, wherein said prediction block advantageously minimizes the difference between the current block to be coded and its prediction block, i.e., it minimizes the residual block. The minimization of the residual block can be based, e.g., on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The difference between the current block and its prediction, i.e. the residual block, is then transformed by the transform unit 101. The transform coefficients are quantized by the quantization unit 102 and entropy coded by the entropy encoding unit 103. The thus generated encoded video bitstream comprises intra coded blocks and inter coded blocks and the corresponding signaling (such as the mode indication, indication of the motion vector, and/or intra-prediction direction). The transform unit 101 may apply a linear transformation such as a discrete Fourier transformation (DFT) or a discrete cosine transformation (DCT). Such transformation into the spatial frequency domain provides the advantage that the resulting coefficients have typically higher values in the lower frequencies. Thus, after an effective coefficient scanning (such as zig-zag), and quantization, the resulting sequence of values has typically some larger values at the beginning and ends with a run of zeros. This enables further efficient coding. The quantization unit 102 performs a lossy compression by reducing the resolution of the coefficient values. Entropy coding unit 103 then assigns binary codewords to coefficient values. The codewords are written to a bitstream referred to as the encoded bitstream. The entropy coder also codes the signaling information (not shown in FIG. 1).

Figure 2:
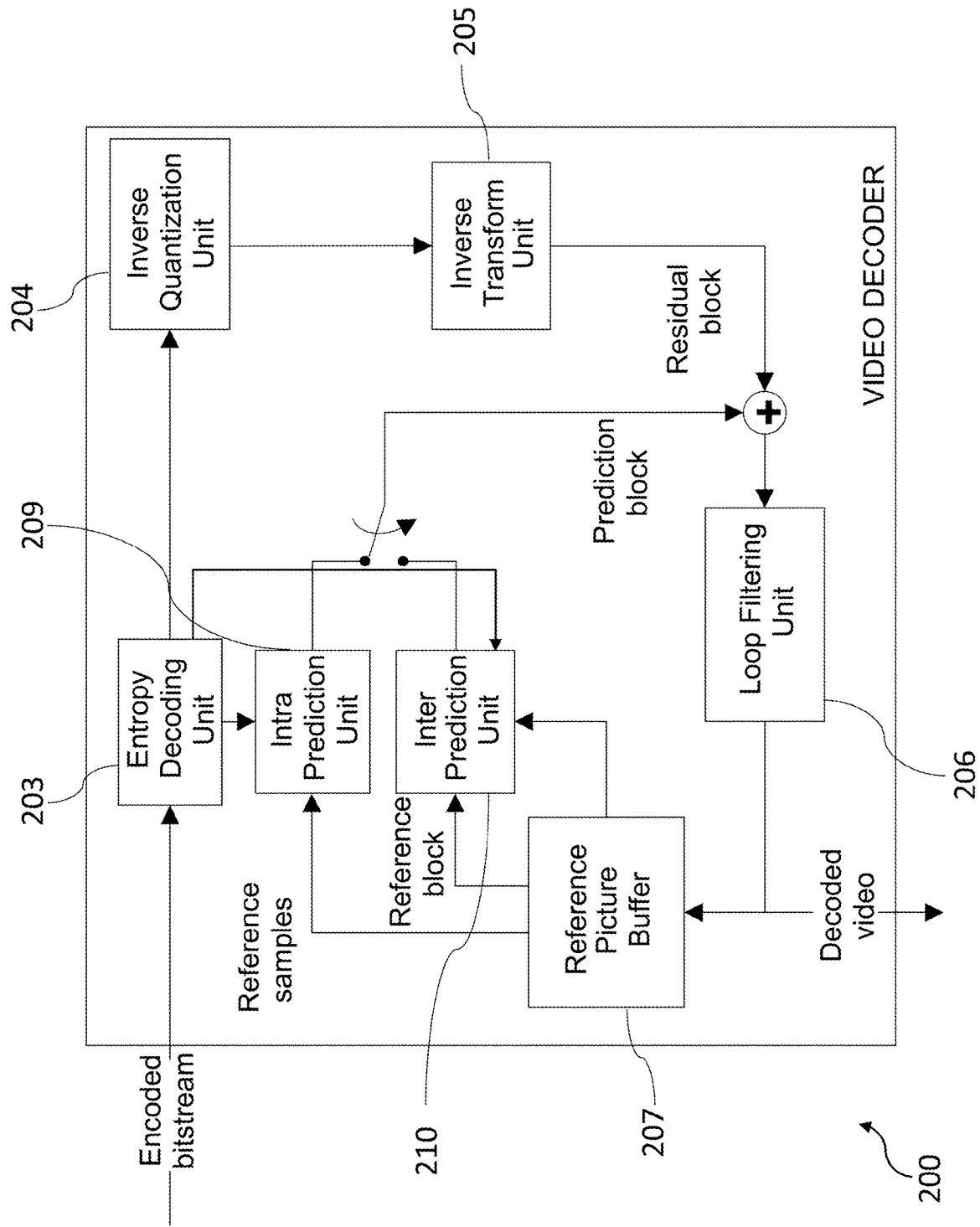
FIG. 2 is a block diagram showing an exemplary structure of a video decoder.

FIG. 2 shows an example of a video decoder 200. The video decoder 200 comprises particularly a reference picture buffer 207 and an intra prediction unit 209, which is a block prediction unit. The reference picture buffer 207 is configured to store at least one reference frame reconstructed from the encoded video bitstream of the encoded video bitstream. The intra prediction unit 209 is configured to generate a prediction block, which is an estimate of the block to be decoded. The intra prediction unit 209 is configured to generate this prediction based on reference samples that are obtained from the reference picture buffer 207.

The decoder 200 is configured to decode the encoded video bitstream generated by the video encoder 100, and preferably both the decoder 200 and the encoder 100 generate identical predictions for the respective block to be encoded/decoded. The features of the reference picture buffer 207 and the intra prediction unit 209 are similar to the features of the reference picture buffer 107 and the intra prediction unit 109 of FIG. 1.

The video decoder 200 comprises further units that are also present in the video encoder 100 like, e.g., an inverse quantization unit 204, an inverse transform unit 205, and a loop filtering unit 206, which respectively correspond to the inverse quantization unit 104, the inverse transform unit 105, and the loop filtering unit 106 of the video coder 100.

An entropy decoding unit 203 is configured to decode the received encoded video bitstream to obtain quantized residual transform coefficients and signaling information. The quantized residual transform coefficients are fed to the inverse quantization unit 204 and an inverse transform unit 205 to generate a residual block. The residual block is added to a prediction block and the resulting sum is fed to the loop filtering unit 206 to obtain a decoded video block. Frames of the decoded video can be stored in the reference picture buffer 207 and serve as reference frames for inter prediction.

Generally, the intra prediction units 109 and 209 of FIGS. 1 and 2 can use reference samples from an already encoded area to generate prediction signals for blocks that need to be encoded or need to be decoded.

The entropy decoding unit 203 receives as its input the encoded bitstream. The bitstream may first be parsed, i.e. the signaling parameters and the residuals are extracted from the bitstream. The syntax and semantic of the bitstream may be defined by a standard so that the encoders and decoders may work in an interoperable manner. As described in the above Background section, the encoded bitstream includes further information in addition to the prediction residuals. In case of motion compensated prediction, a motion vector indication is also coded in the bitstream and parsed from the bitstream at the decoder. The motion vector indication may be given by means of a reference picture within which the motion vector is provided and by means of the motion vector coordinates. In this example, the motion vector coordinates are x and y coordinates within the reference picture and they define the point to which the motion vector shows, assuming that the coordinate (0, 0) is the position within the reference frame corresponding to the position of the current block being processed in the current frame. However, motion vector indication does not have to signal directly the coordinates. In general, any identification of the motion vector is applicable, such as a pointer (index) to a list of candidate motion vectors or any other identifier which enables identifying the inter-prediction of the block.

In order to efficiently code the reference picture, H.265 codec (ITU-T, H265, Series H: Audiovisual and multimedia systems: High Efficient Video Coding) provides a list of reference pictures. Each entry of the list indicates a particular reference frame. In other words, each index (i.e. entry number) of the list is assigned a respective reference frame. The bitstream includes, for each inter frame, a respective list index and thus identifies a certain reference frame for reconstructing that inter frame. The list may be defined in the standard or signaled at the beginning of the video or a set of a number of frames. It is noted that in H.265 there are two lists of reference pictures defined, called L0 and L1. The reference picture is then signaled in the bitstream by indicating the list (L0 or L1) and indicating an index in that list associated with the desired reference picture. Providing two or more lists may have advantages for better compression. For instance, L0 may be used for both uni-directionally inter-predicted slices and bi-directionally inter-predicted slices while L1 may only be used for bi-directionally inter-predicted slices. However, in general the present disclosure is not limited to any content of the L0 and L1 lists.

The motion vector may be signaled directly by the coordinates of the block to which the motion vector points (in the reference picture). Alternatively, as specified in H.265, a list of candidate motion vectors may be constructed and an index associated by the list with the particular motion vector can be transmitted.

Motion vectors of the current block are often correlated with the motion vectors of neighboring blocks in the current picture or in the earlier coded pictures. This is because neighboring blocks are likely to correspond to the same moving object with similar motion and the motion of the object is not likely to change abruptly over time. Consequently, using one or more motion vectors of spatially or temporally neighboring blocks to define a predictor (referred to as the motion vector predictor, MVP) for the motion vector of the current block reduces the size of the signaled motion vector difference. The MVP can be derived from already decoded motion vectors from spatially neighboring blocks or from temporally neighboring blocks in the co-located picture. In H.264/AVC, this is done by doing a component-wise median of three spatially neighboring motion vectors. Using this approach, no signaling of the predictor is required. Temporal MVPs from a co-located picture are currently considered only in the so called temporal direct mode of H.264/AVC. The H.264/AVC direct modes are also used to derive motion data other than the motion vectors. Hence, they relate more to the block merging concept in HEVC. In HEVC, the approach of implicitly deriving the MVP was replaced by a technique known as motion vector competition, which explicitly signals which MVP from a list of MVPs is used for motion vector derivation. The variable coding quadtree block structure in HEVC can result in one block having several neighboring blocks with motion vectors as potential MVP candidates. Taking the left neighbor as an example, in the worst case, a 64×64 luma prediction block could have 16 4×4 luma prediction blocks to the left when the 64×64 luma prediction block is not further split and the left one is split to the maximum depth.

Advanced Motion Vector Prediction (AMVP) was introduced to modify motion vector competition to account for such a flexible block structure. During the development of HEVC, the initial AMVP design was significantly simplified to provide a good trade-off between coding efficiency and an implementation friendly design. The initial design of AMVP included five MVPs from three different classes of predictors: three motion vectors from spatial neighbors, the median of the three spatial predictors and a scaled motion vector from a co-located, temporally neighboring block. Furthermore, the list of predictors was modified by reordering to place the most probable motion predictor in the first position and by removing redundant candidates to assure minimal signaling overhead. The final design of the AMVP candidate list construction includes the following two MVP candidates: a) up to two spatial candidate MVPs that are derived from five spatial neighboring blocks; b) one temporal candidate MVPs derived from two temporal, co-located blocks when both spatial candidate MVPs are not available or they are identical; and c) zero motion vectors when the spatial, the temporal or both candidates are not available. Details on motion vector determination can be found in the book by V. Sze et al (Ed.), High Efficiency Video Coding (HEVC): Algorithms and Architectures, Springer, 2014, in particular in Chapter 5, incorporated herein by reference.

As will be described in detail below, the motion vector derived at the encoder side and provided in the bitstream can be refined further. Motion vector estimation can thus be improved without further increase in signaling overhead. The motion vector refinement may be performed at the decoder without assistance from the encoder. The decoder loop in the encoder may employ the same refinement to obtain corresponding reference pictures. The refinement can be performed by determining a template, determining a search space, and finding in the search space the position of a reference picture portion best matching the template. The best matching portion position determines the best motion vector which is then used to obtain the predictor of the current block, i.e. the current block being reconstructed.

In operation, the circuitry of an inter prediction unit 110, which may be implemented in the video encoder 100 of FIG. 1, performs motion estimation (see FIG. 3) in order to obtain a motion vector for inter prediction of a current block. Similar prediction may also be performed by the inter prediction unit 210 of the video decoder 200 of FIG. 2, to which FIG. 3 and the accompanying description apply as well.

An initial motion vector MV0, which can be seen as a first estimate or approximation of the exact motion vector, is obtained by the inter prediction unit 110. For instance, MV0 may be selected from a list of candidate motion vectors. The list may include motion vectors of at least one block adjacent to the current block. Alternatively, MV0 may be obtained by block matching at the encoder side and signaled to the decoder side within the bitstream. Correspondingly, at the decoder side, the inter-prediction unit 210 can obtain the initial motion vector MV0 from the bitstream. For instance, an index to the list of candidates is extracted from the bitstream and the motion vector candidate identified by that index is provided to the inter-prediction unit as the initial motion vector MV0. Alternatively, coordinates of MV0 are directly extracted from the bitstream. However, the present disclosure is not limited to any particular way of obtaining the initial motion vector MV0. In general, the MV0 may be determined in any manner, for instance by template matching in the same way at the encoder and the decoder. Still alternatively, the motion vector may be predicted as a function of motion vectors of the neighboring block of the current block in the spatial or temporal domain.

The initial motion vector MV0 is an initial estimate of a final motion vector MV0" to be used in inter-prediction of a current block. It constitutes the input for a refinement process at the end of which the final motion vector MV0" is output. The refinement process comprises determining a search space and selecting the final motion vector from the search space.

Generally, the search space construction (e.g., performed by a search space determination unit 310 of the inter prediction unit 110 or 210) comprises two stages, in each of which a part of the search space is constructed. A motion vector selecting unit 340 (also part of the inter-prediction unit 110 and/or 210) then selects the motion vector MV0" (corresponding to coordinates of a search space position) according to the matching cost. It is noted that for some candidate motion vectors of the search space, possibly for all candidate motion vectors of the respective partial search spaces determined in each of the stages, the costs may be calculated already as a part of and during the search space construction.

The search space construction includes the first stage 301 of constructing the first (partial) search space. Out of the positions of the first search space determined in the first stage 301, at least two candidate positions are chosen 302 and are used to decide which candidate positions are to be checked in the second stage 303.

In other words, based on the initial motion vector MV0, a first search space including a plurality of candidate motion vectors is determined 301. In the first search space, a first candidate motion vector and a second candidate motion vector are identified 302 according to a cost function. Based on the first and the second candidate motion vectors, a second search space is determined 303 including one or more candidate motion vectors. From among the candidate motion vectors of both the first search space and the second search space, the motion vector MV0" for the current block is selected by the motion vector selecting unit 340. In particular, the candidate is found that minimizes the cost function after the second search space has been evaluated, and this candidate is selected as the final motion vector MV0" to be applied in the inter-prediction. The first search space is equivalent to a first subset of positions in a reference picture, namely the subset of positions pointed to by the candidate motion vectors of the first search space. Similarly, the second search space is equivalent to a second subset of positions in a reference picture, namely the subset of positions pointed to by the candidate motion vectors of the second search space.

The motion vector refinement is performed in a search space which is a subset of positions in a reference picture and which comprises positions of the first and the second search space. The positions are locations to which the respective candidate motion vectors point, i.e. locations at which the match with a template is to be evaluated. The reference picture may be available in an integer or fractional resolution. Irrespectively of the reference picture resolution, the search space or its part may have an own resolution lower or higher from the reference picture. A higher resolution can be achieved by performing a fractional pixel interpolation to obtain fractional pixels.

For example, the initial motion vector MV0 may point to an integer pixel position, also referred to as a full-pixel position. Alternatively, MV0 may point to a fractional pixel position, e.g., a half pixel position or a quarter pixel position. Here as well as in the rest of the description, "half pixel position" (and, respectively, "quarter pixel position") refers to a point on a line between two adjacent full-pixel positions (i.e. neighboring pixels in full-pixel resolution), the fractional pixel position having a distance to the next full pixel position which is a half (or, respectively, a quarter) of the distance between the two neighboring full pixel positions.

In different embodiments of the present disclosure, irrespective of whether MV0 points at a full-pixel or a half-pixel position, the first search space and the second search space may either have the same resolution or differ in resolution. For instance, the second search space may have a higher resolution than the first search space. Thus, the second search space can be seen as a refinement of the first search space.

Advantageously, the first search space has a full pixel resolution. Then, if the resolution of the second search space is different from the resolution of the first search space, the resolution of the second search space may be a fractional pixel resolution such as half pixel resolution. It is noted that the resolution of the search space may differ from the resolution of the reference picture. For instance, the initial motion vector may point to a half-pixel within the reference picture. Nevertheless, the first search space may include only positions that are in a distance of at least an integer pixel from each other. These positions may nevertheless be all located on the sub-pixel pixels of the reference picture.

Figure 4:
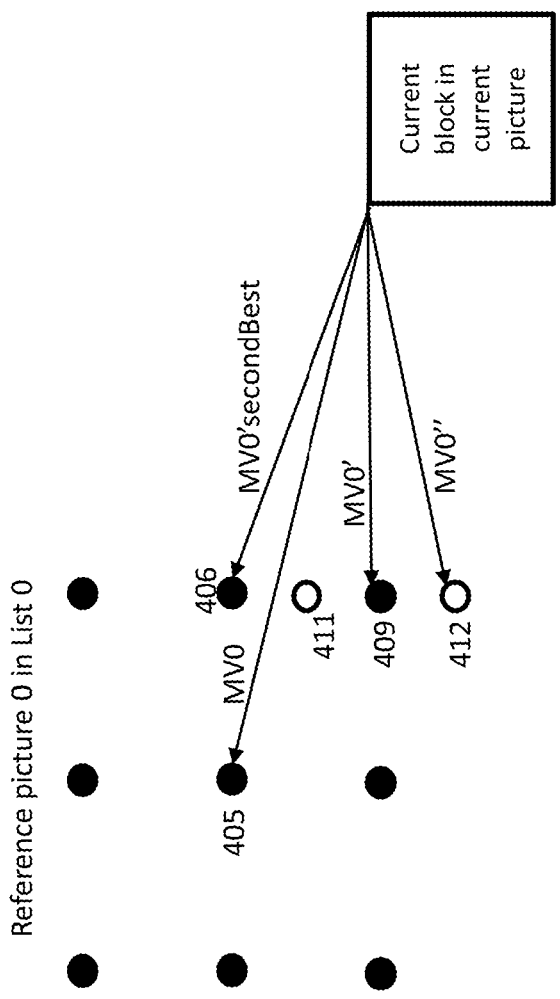
FIG. 4 is a schematic drawing of a current block and an exemplary search space configuration.

In FIG. 4 as well as in the remaining figures in which different configurations of the search space according to various embodiments of the present disclosure are shown, a full-pixel resolution is indicated by means of shaded (full) dots, whereas fractional pixel positions are illustrated as non-shaded (empty) dots. The pixels of the pictures in the video which is coded or decoded may be arranged in a square pattern. In general, however, they may have a generic rectangular pixel pattern which is not necessarily a square pattern. The present disclosure is generally not limited to any particular pixel pattern. The pixels may also be arranged in a non-rectangular pattern.

In one implementation, the candidate motion vectors for the current block point from the top left pixel of the current block in the current picture (assumed as having coordinate (0, 0)) to the respective top left pixels of candidate prediction blocks in the reference picture (as illustrated in FIG. 4). The top left pixels of the candidate prediction blocks thus represent the search space in the reference picture. In this implementation, the top left pixel of a block is taken as the position of the block. However, any other pixel of a block can be taken as the position of the block, wherein it is understood that the same position convention applies to all blocks. For example, a motion vector may be defined equivalently as running from a center pixel of the current block to the center pixel of a respective candidate block.

As an example (see FIG. 4 again), the first search space includes nine candidate motion vectors, namely the initial estimate MV0 of the motion vector as well as its four nearest neighboring positions and its four second nearest neighboring positions in full-pixel resolution. The constellation of the first search space in FIG. 4 is a "square" constellation, meaning that the distances between the pixels in vertical and horizontal dimensions are the same. As will be shown when describing the embodiments of the present disclosure, constellations with various sizes and shapes may be used for the first search space.

As explained above, the motion vector refinement scheme can be performed in the same way at the encoder and the decoder without additional control signaling. This can be achieved, for example, by providing a template at the encoder side as well as at the decoder side. The template may be determined, for example, from already encoded/decoded pixels (e.g. using one of the techniques described in the above mentioned document JVET-D0029). An example of such a template may be pixels of one or more blocks decoded before the current block and neighboring the current block. More particularly, the template for the refinement of a motion vector for a current block may be determined to be N pixels of the neighboring block at the left boundary and M pixels of the neighboring block at the top boundary, assuming that the decoding of blocks is performed from left to right and from top to bottom, as usual. M and N are integers larger than 1. However, the template may be determined differently and also include apart from the pixels of neighboring blocks directly adjacent to the boundary with the current block, other pixels of the neighboring blocks, and/or the entire boundary of one or more neighboring blocks.

In fact, the motion vector refinement is mostly relevant for the decoder. As no information is encoded in the bitstream concerning the refinement of the particular motion vector, the encoding side applies the refinement only in the decoding loop in order to produce reference images taking into account the refined motion vectors.

Similarity may be measured by a cost function which may, for example, be a sum of absolute differences between the template and the reference picture area that corresponds to the template in the location pointed to by the motion vector candidate. After calculating the sum of absolute differences (SAD) for all candidate motion vectors, the candidate with the smallest SAD is selected. However, it is noted that SAD is only an example and any other similarity metric such as sum of square differences or correlation or the like may be applied.

The first candidate motion vector and the second candidate motion vector respectively refer to a position of a predictor of the current block which is most similar (and second most similar, respectively) to a predetermined template. The template may be generated in a preceding step, e.g., using one of the techniques described in JVET-D0029.

A method for motion vector determination by refinement is described in the following with respect to FIG. 18. The method starts in S1801. In S1802, an initial estimate MV0 of the motion vector is obtained, and a first search space is set based on the initial estimate of the motion vector. The first search space comprises candidate motion vectors pointing to positions surrounding the position associated with MV0. The costs associated with the candidate motion vectors of the first search space are calculated in S1803, and according to the calculated costs, a first candidate motion vector and a second candidate motion vector, P1 and P2, are selected. In accordance with P1 and P2, a second search space including one or more candidate motion vector(s) is set in step S1804. The second search space can be fairly small (and thus be searched quickly) because it is set based on the two most promising points. In particular, by considering two (or more than two) positions, a trend direction in which the cost (i.e. the value of the cost function) diminishes (or probably diminishes) may be determined, and the second search space may be set in the trend direction and may have a smaller size compared to, e.g., setting the second search space only on the basis of the initial motion vector or on the basis of a single best point. It is further noted that in general, the present disclosure is not limited to taking into account two best candidate motion vectors (respective positions to which they point). In general, the trend of the cost function may be determined even more precisely by taking more than two best positions into account. In such cases, the direction in which the cost function decreases is determined based on the considered two or more positions with the lowest costs among the positions of the first search space. The second search space is then set in a location in the direction of the trend. Accordingly, the number of positions of the search space and in particular of the second search space can be kept low, while still checking the most promising positions.

The costs associated with the candidate motion vector(s) of the second search space are calculated in S1805. From the candidate motion vectors of the first and the second search space, the best candidate motion vector, i.e. the candidate motion vector associated with the lowest cost, is selected (in S1806). After selecting the best candidate motion vector, the motion vector refinement terminates (in S1807).

Different embodiments of the present disclosure may differ, inter alia, in the way in which the first search space and the second search space are determined, as will be described in the following.

First Exemplary Embodiment

According to a first exemplary embodiment (see FIG. 4), a cost function is evaluated for each of the candidate motion vectors of the first search space. In other words, for each of these motion vectors, a respective cost, which is the value of the cost function, is calculated or estimated or otherwise determined. According to this evaluation, the candidate with the minimum cost and the candidate with the second lowest cost are selected. In the example of FIG. 4, an initial motion vector MV0 points to a position 405. A position 409 in the first search space has the lowest cost and is therefore selected as the first candidate motion vector MV0'. The right neighbor 406 of MV0 has the second lowest cost and is therefore selected as the second candidate motion vector MV0'secondBest. MV0' and MV0'secondBest are used to construct the second search space. In the example, the second search space comprises two additional candidate motion vectors, which point to half pixel positions 411 and 412 (empty circles in the figure) located on a line connecting positions 409 and 406 (i.e. MV0' and MV0'secondBest). In this example, the half pixel positions 411 and 412 are half pixel positions above and below MV0', respectively. From the candidates of the first search space and the candidates of the second search space, the candidate with the minimum cost is selected as the final motion vector MV0", in this example the position 412.

The example of FIG. 4 illustrates motion vector refinement for one current block and one reference picture, namely the reference picture which is assigned index 0 in a reference picture list L0. The drawing of the current block is merely schematic and illustrates that a position of a search space point corresponds to a position of the search template which is given by the template's top left corner. The present disclosure is applicable with any size and form of the template. The template is advantageously a block of a size of the current block and the search of the two best candidate motion vectors is performed by template (block) matching in the first search space and the second search space. Since the current block is in general not available at the decoder, the template is constructed out of already decoded image portions. For instance, in case of bi-prediction, there are two initial motion vectors MV0 and MV1 associated with the respective two reference pictures RefPict0 and RefPict1. A template block for the motion vector refinement may then be constructed by weighted averaging of two blocks respectively pointed to by MV0 in Refpict0 and MV1 in RefPict1. Other template constructions are possible based on already decoded pixels from the current picture or the respective reference pictures or closest pictures already decoded.

In accordance with a direction of a line connecting the tip (i.e. endpoint) of the first candidate motion vector and the tip of the second candidate motion vector MV0'secondBest, the size (i.e. the number of candidates) and/or the position (location) of the second search space (i.e. the position(s) pointed at by the candidate motion vector(s) of the second search space) are determined. In particular, the first candidate motion vector and the direction (line) given by connecting the tips of the first and second candidate motion vectors are used to decide on the number and/or coordinates of the candidates used in the second step. The size of the second search space may be determined in accordance with the position at which the first candidate motion vector MV0' points. However, it is noted that the present disclosure is not limited to determine both the size and the position of the second search space based on the two best points. For instance, the size (in terms of the number of positions) of the second search space may be fixed and only the location of the second search space may be determined based on the two best positions.

Search space configurations according to the first embodiment of the present disclosure are exemplarily illustrated in FIGS. 5 to 8, 10, and 11. In these examples, the size of the second search space is always 2, but its location is given by the two best points of the first search space. As can be seen in the figures, the first search space having a first (e.g., integer) pixel resolution has the "square" constellation already shown in FIG. 4. From this first search space, with nine points (eight points surrounding the initial vector point MV0) the first candidate motion vector MV0' and a second candidate motion vector MV0'secondBest are identified according to the cost function.

Advantageously, according to the first embodiment, the first search space, which includes a plurality of candidate motion vectors, has the integer pixel resolution. Accordingly, the first candidate motion vector MV0' which points to a position where the cost function is minimized after the first step, and the second candidate motion vector MV0'secondBest which has the second lowest value of the cost function, are first determined using integer pixel search resolution.

Furthermore, the second search space has a fractional pixel resolution with respect to the resolution of the first search space, and includes one or more candidate motion vectors which point to positions located in the direction given by the first and second candidate motion vectors included in the first search space. Accordingly, in the second stage (more precisely, in "stage 2" 303 from FIG. 3), one or more, for instance two, half pixel positions of the second search space (i.e., the new search window) This means that, since with MV0' the best candidate of the first search space is known, the cost of MV0' only needs to be further compared with costs of the additional points of the second search space until a candidate motion vector is found that has a lower cost than MV0' to finally perform the motion vector selection. In this case, the second search step involving the second search space has a finer precision than the first search step. In other words, it may be advantageous if the second search space has a higher resolution (i.e., lower distance between the search space positions) than the first search space. In this way, the search space is refined with each stage of its construction and may include more than 2 such stages. For example, based on two best points of the joint first and second search space, a third search space with a resolution higher than the first and second search spaces may be constructed.

In the example of FIGS. 4 to 8, the one or more half pixel positions of the second search space are selected according to the direction of a line connecting MV0' and MV0' secondBest corresponding to a difference vector MV0'diff= (MV0'−MV0'secondBest). Thus, the second search space is determined in accordance with an angle between MV0'diff and a picture boundary (or a horizontal row of pixels in the reference picture). At the end of the second search step, the final motion vector MV0" is determined in stage 304 of FIG. 3.

Further, at least one of the candidate motion vectors of the second search space advantageously points to a position between positions pointed to by the first and the second candidate motion vectors included in the first search space. It is noted that the second search space may include a single candidate motion vector which is the point between the first and the second candidate motion vectors.

Further exemplary search space constellations according to the first embodiment of the present disclosure will be described in the following with respect to FIGS. 5 to 8, 10, and 11.

In FIGS. 5 to 8, MV0' points at one of the nearest or second nearest neighboring positions of the initial motion vector MV0 (i.e., of the position in the center of the first search space), i.e., to one of the positions immediately surrounding the MV0 position. The second search space is determined to comprise two candidate motion vectors which point at positions on two sides of MV0', which both point approximately to positions on a line connecting MV0' and MV0'secondBest. In other words, the second search space includes a first position between MV0' and MV0'secondBest and a second position in the direction connecting MV0' and MV0'secondBest and located on the other side than the first position.

Here as well as in the rest of the present application, the "nearest" neighbor or neighboring or adjacent position refers to the position adjacent to the given position in the resolution of the considered (partial) search space. For instance, even if the reference picture has a fractional ¼ pixel resolution, if the first search space has an integer resolution, adjacent positions also have the integer pixel distance from each other in the first search space. This applies although the first search space positions may be located on fractional pixel positions of the reference picture.

Furthermore, the "second nearest position" refers to a position adjacent to two nearest neighbors (diagonal neighbors in rectangular arranged search spaces). However, in a general case which is not shown in any of the figures, the distance to the adjacent position in one direction (e.g., the vertical direction) may differ from the distance in the other direction (e.g., the horizontal direction). In this case, the term "nearest neighbor" as used in the present disclosure, applies to the adjacent position in both directions, regardless of a possible difference in the distance.

In FIGS. 5 and 6, MV0' and MV0'secondBest are nearest neighbors with respect to each other in the resolution of the first search space (i.e., full pixel resolution). In the figures, the line connecting MV0' and MV0'secondBest is a vertical line. The search space constellation shown in FIG. 5 is identical to the search space constellation shown in FIG. 4. The line connecting the first candidate and the second candidate motion vectors corresponds to a horizontal line if MV0'secondBest is situated to the left or to the right of MV0' rather than being situated above or below MV0'. Although not shown in the figures, the first embodiment also applies to case in which the first candidate motion vector and the second candidate motion vector are connected by a horizontal line.

In the example shown in FIG. 7, the second candidate motion vector MV0'secondBest points to a second nearest neighbor of the first candidate motion vector MV0'. In such a case, the line connecting the first and second candidate vectors is a diagonal line.

It is usually expected that the similarity between a predictor of a current block and a template block increases monotonously in one direction. Accordingly, as in FIGS. 5 to 8, in the resolution of the first search space, the candidate vectors MV0' and MV0'secondBest should be nearest or second nearest neighbors. However, it may occur, that there is a third candidate motion vector of the search space between MV0' and MV0'secondBest for which value of the cost function is higher than for each of the candidate motion vectors MV0' and MV0'secondBest, as shown in FIG. 8. For example, such a situation may occur due to noise in the video which is encoded/decoded. In such a situation, two fractional pixel positions on the line connecting MV0' and MV0'secondBest may be chosen to form the second search space which are closer to MV0' than to MV0'secondBest, but still located in the direction given by the two best points of the first search space. However, the present disclosure is not limited by such proceeding. For instance, in order to maintain low complexity, if the cost function trend is not monotone based on the two or more positions with the lowest costs, a default second search space may be set assuming, for instance, a horizontal direction. The horizontal direction may be considered as a more likely direction in natural video sequences, due to the panning of the camera, as well as movement of typical objects in natural videos. In other word, if there is no clear trend of the cost function based on the first and the second best motion vector candidates of the first search space, preferably some points around the first best candidate motion vector are set as the second search space. In order to reduce the size of the second search space, a default direction may be assumed and the corresponding default second search space may be set.

Figure 9:
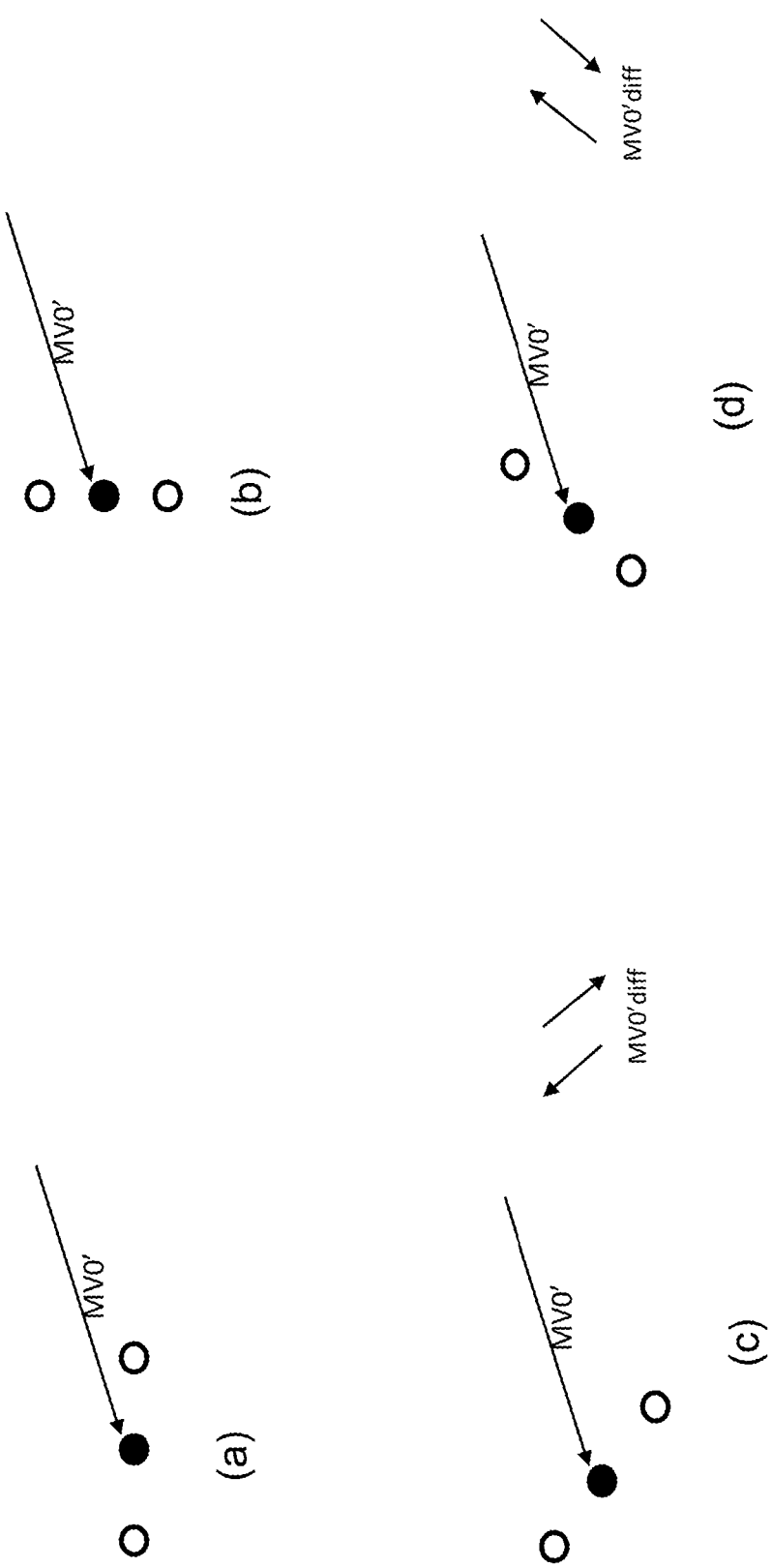
FIG. 9 is a schematic drawing illustrating the determination of a second search space according to the first exemplary embodiment.

The proceeding for the determination of the second search space in the second stage according to the first embodiment is illustrated in FIG. 9. In particular, the pixel positions to which the candidate motion vectors of the second search space point are determined according to the components of the difference vector MV0'diff=(MV0'−MV0'secondBest).

If the MV0' diff only has a horizontal (i.e. non-zero) component, the second search space is determined to comprise the two positions to the left and to the right of MV0' each having a distance to MV0' which corresponds to the resolution of the second search space (e.g. half pixel resolution), as shown in FIG. 9(a). Further, if MV0'diff only has a vertical component, the second search space is determined to comprise two positions to above and below MV0' each having a distance to MV0' which corresponds to the resolution of the second search space (see FIG. 9(b)).

If MV0' diff has both a horizontal and a vertical component (with a non-zero value), as shown in part (c) and (d) of FIG. 9, the second search space is selected to second nearest (diagonal) neighbor positions with respect to the position associated with MV0' in the resolution of the second search space. If the horizontal and vertical component are both positive or both negative, second nearest neighbor positions on the top left and on the bottom right with respect to MV0' are selected, as shown in FIG. 9(c). If one component is positive and the other component is negative, second nearest neighbor positions on the bottom left and on the top right with respect to MV0' are selected (FIG. 9(d)). Else, if MV0'diff cannot be determined (e.g., due to characteristics of the cost function such as all candidates of the first search space having the same costs), MV0'diff may be set as (0,0), and an arbitrary choice, for instance among the alternatives shown in FIGS. 9 (a)-(d), may be made for a default second search space. However in this case, the configuration of search points in part (a) is preferable (over (b), (c) and (d)) due to the statistical properties of the video sequences in general (a horizontal object or camera movement is more likely than vertical, as usually area of interest lies in a horizontal direction).

It should be noted that in FIG. 9, as well as in the rest of the application where coordinates are considered, the positive direction of the horizontal axis ("x-axis") points to the right (as in an ordinary Cartesian coordinate system), whereas the positive direction ("y-axis") of the vertical axis points to the bottom (contrary to the Cartesian convention but typically used in image processing).

In all of the search space constellations shown in FIGS. 5 to 8, the first candidate motion vector MV0' points at pixel positions that are at the edge of the first search space. In particular, one candidate motion vector points at a position between two candidate motion vectors of the first search space. The other candidate motion vector of the second search space points to a position outside the first search space, i.e. a position which is not surrounded by candidate motion vectors of the first search space.

However, as mentioned above, not only the position(s) of the candidate motion vector(s) of the second search space, but also the size (i.e., the number of candidate motion vector(s)) in accordance with a direction of a line connecting the candidate motion vectors MV0' and MV0'secondBest.

More specifically, if the first candidate motion vector MV0' points at a position in the center of the first search space, one candidate vector is sufficient for the second search space. In particular, the single candidate motion vector of the second search space then points at a position of the resolution of the second search space between two candidate motion vectors of the first search space. However, in contrast to the search space constellations shown in FIGS. 5 to 8, the second candidate motion vector outside the first search space is omitted. The proceeding illustrated in FIG. 9 is modified accordingly to determine only one candidate motion vector of the second search space, i.e. the search window of the second search step.

Examples of the second search space comprising only one motion vector candidate are shown in FIGS. 10 and 11. In FIG. 10, MV0' and MV0'secondBest are nearest neighbors (adjacent horizontally), and in FIG. 11, MV0' and MV0'secondBest are second nearest neighbors (adjacent diagonally). As shown in both figures, MV0' points to a position within the first search space. In other words, there are candidate motion vectors pointing to all pixel positions adjacent to MV0'. One of these candidate motion vectors pointing to an adjacent position is MV0'secondBest.

In other words, the second search space comprises only one candidate motion vector pointing at a fractional pixel position between the first and the second candidate motion vector if the first candidate motion vector MV0' if the second position adjacent to MV0' in the first search space and located in the direction given by connecting MV0' and MV0'secondBest belongs to the first search space. In such situation, since the second position has already cost calculated and higher than MV0' as well as MV0'secondBest, the probability that a low-cost candidate can be found in this direction is rather low. In general, the number of positions in a search space may also depend on the likelihood that a candidate motion vector better (in terms of cost) than MV0' could be found. The likelihood may be estimated by interpolating and/or extrapolating the cost function calculated for the positions of the first search space.

It is noted that in the above examples, the first search space has been illustrated having 9 adjacent positions arranged in a square grid. However, the present disclosure is not limited to a particular size of the search space or to a particular arrangement of the pixels. Similarly, the first embodiment may be applied to first and second search spaces having the same or different resolutions (the latter shown in FIGS. 5 to 8). The second search space may also have more than two positions.

Figure 18:
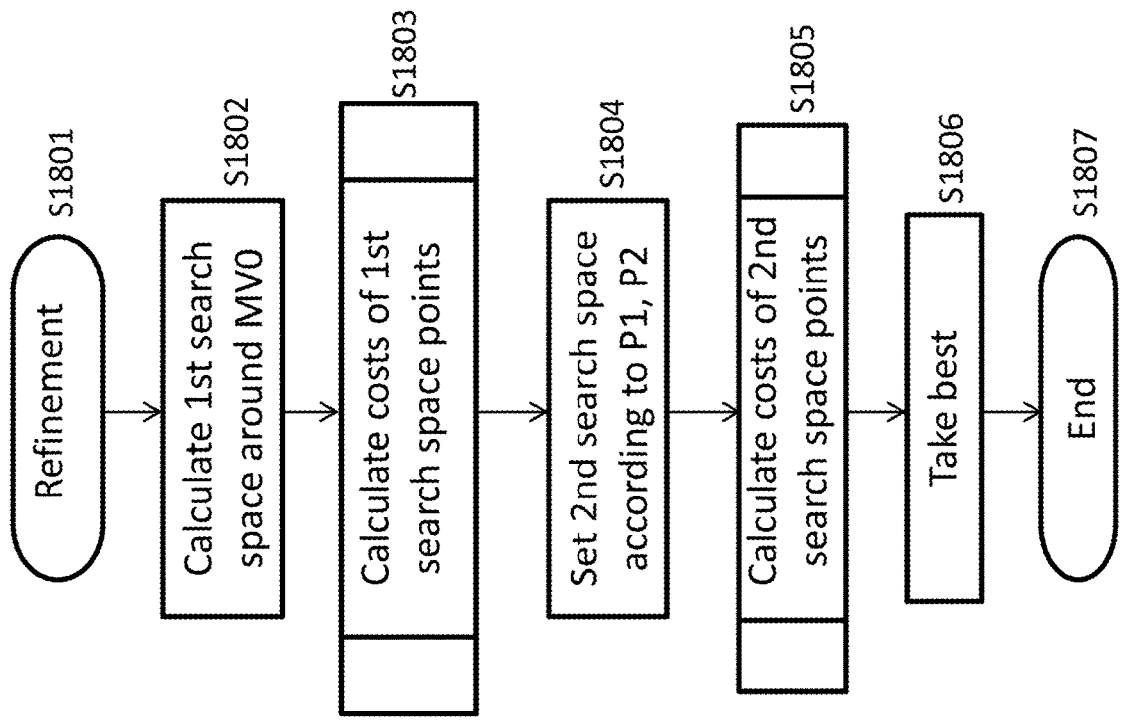
FIG. 18 is a flow chart showing a method for motion vector refinement.
Figure 19:
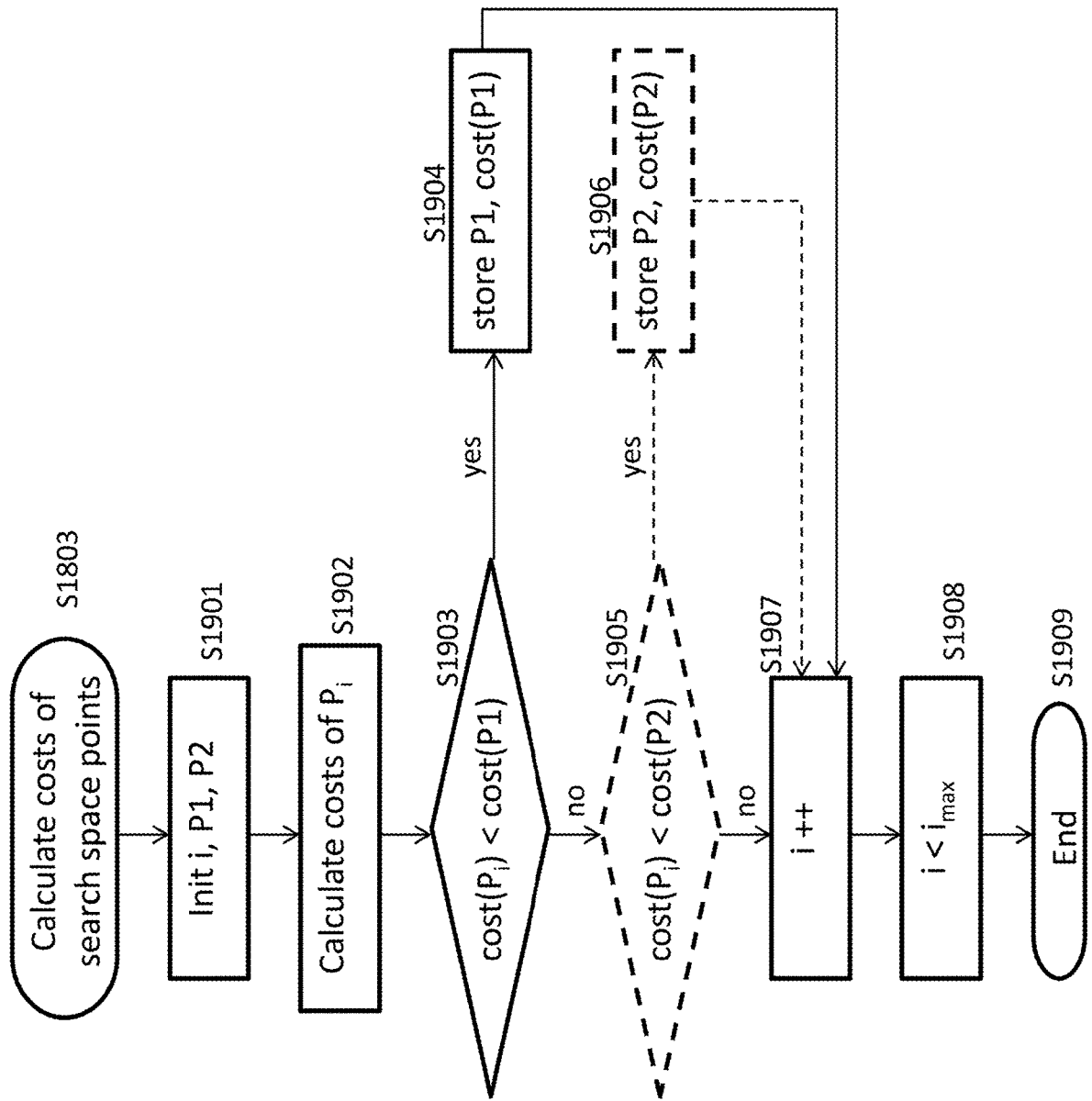
FIG. 19 is a flow chart showing a method for calculating costs for search space positions.

According to the first exemplary embodiment, the substep S1803 of calculating the costs for the candidate motion vectors of the first search space in the refinement method of FIG. 18 is shown in FIG. 19. The variables i, P1, and P2 are initialized, where i is an index variable subsequently denoting each of the respective candidates of the search space (e.g., the first search space). Variables P1 and P2 denote the respective motion vector candidates with the lowest and second lowest cost (i.e., the position in the search space and the cost value associated with the position). At the beginning, P1 and P2 may be initialized to a value not associated with any position, and the respective costs associated with P1 ans P2 may be initialized to a value higher than any value possibly obtained in a cost calculation, i.e. a maximum cost representable with the variable. In a loop iterating over i, the costs of the i-th candidate motion vector are calculated S1902. The costs of the i-th candidate motion vector are compared S1903 with the costs of the currently stored motion vector P1 with the lowest cost. If the costs of the i-th candidate motion vector are lower than the costs of the stored P1, then P1 is set to the i-th candidate motion vector and stored S1904. If the costs of the i-th candidate are not lower than the costs of the P1, then the costs of the i-th candidate motion vector are compared S1905 with the costs of P2. If the costs of the i-th candidate motion vector are lower than the costs of P2, then P2 is set to the i-th candidate motion vector and stored S1906. After the two steps of comparing S1903, S1905 and possibly one of the steps of storing S1904, S1906, i is incremented. If i has not yet reached a maximum value $i_{max}$ representing the number of motion vector candidates in the first search space S1908, the method returns to the cost calculation step S1902. If i has reached $i_{max}$ S1908, the cost calculation terminates S1909, and the refinement of FIG. 18 continues.

The substep S1805 of calculating the costs for the candidate motion vectors of the second search space may be performed similarly to the steps described in the above description of FIG. 19. However, the steps of comparing S1905 the costs of the i-th candidate motion vector with the costs of P2 and storing S1906 the second candidate motion vector P2 may be omitted. This is because in the second search space search, the result is the best motion vector over the first and the second search space. The second best motion vector has no further use, if the second search space is not further extended.

Second Exemplary Embodiment

According to a second exemplary embodiment, the first candidate motion vector and the second candidate motion vector used in the determination of the second search space are the candidate motion vectors included in the first search space which are associated respectively with the lowest and second matching cost (as in the first exemplary embodiment).

Figure 3:
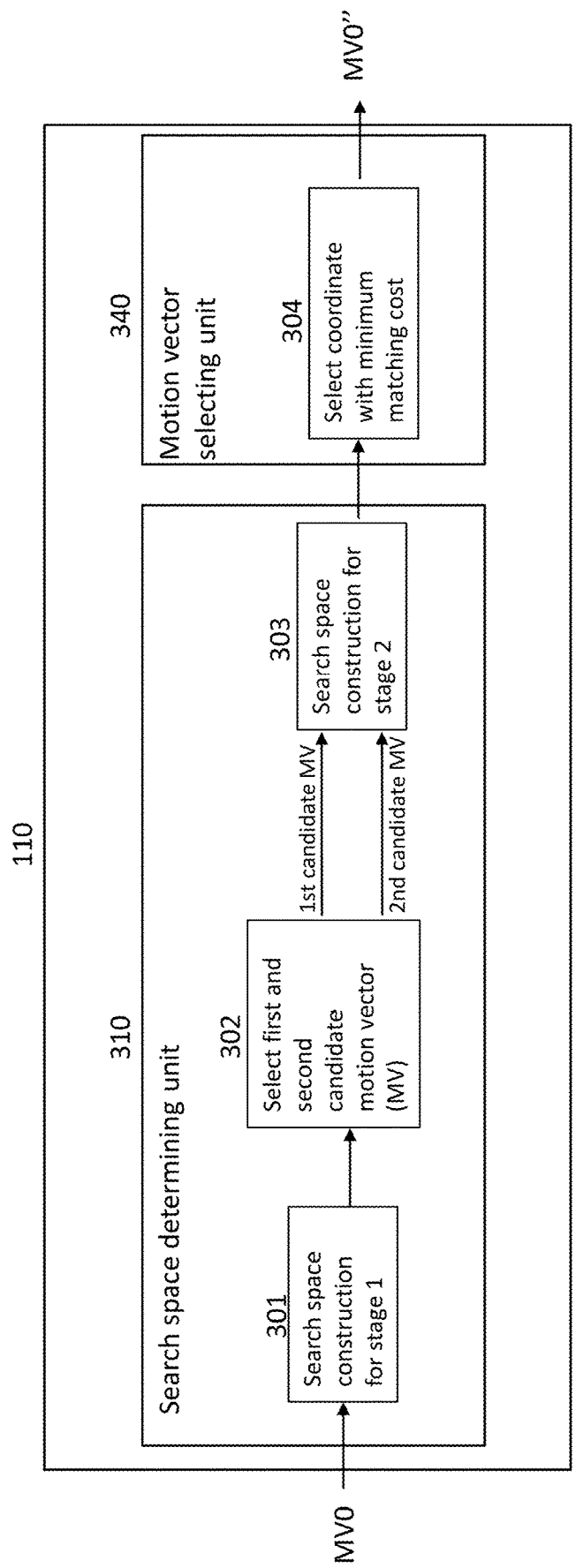
FIG. 3 is a block diagram showing an exemplary structure of an apparatus for determining a motion vector.
Figure 13:
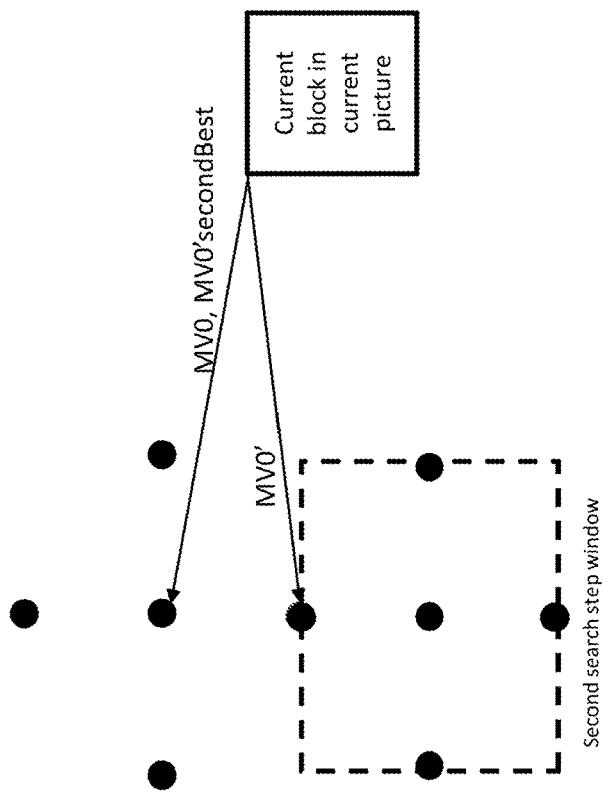
FIGS. 12 and 13 are a schematic drawing of current blocks and an exemplary search space configuration according to a second embodiment.
Figure 12:
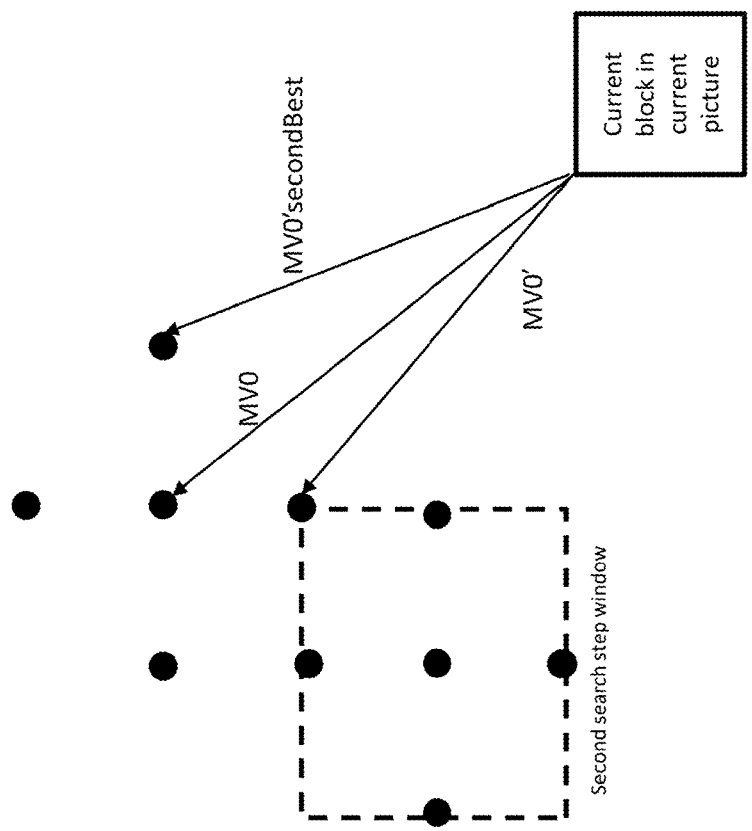

Further, according to the second exemplary embodiment, the search space determination unit 310 of FIG. 3, in operation, determines the location of the second search space which is a region. Here, the term "region" refers to a space including at least two positions to which respective at least two candidate motion vectors point. In particular said at least two positions are adjacent in the pixel resolution of the second search space. The second search space may have the same resolution as the first search space as shown in FIGS. 12 and 13. However, the search spaces may also differ in resolution.

Advantageously, the search space, which is determined in the first stage 301 of the search space construction of FIG. 3, includes the initial estimate of the motion vector MV0 and candidate motion vectors pointing to the positions adjacent, i.e. the nearest neighbors of the initial estimate of the motion vector in a pixel resolution of the first search space to the position pointed to by MV0. In other words, the first search space has a "cross" geometry, in contrast to the first embodiment in which a first search space having a "square" geometry (shape) is constructed in the first stage 301 of the first stage construction. However, it is noted that the first search space may have any shape, as long as the same search space is utilized both in the encoder and decoder. It is advantageous for the simplicity of the implementation, if the search space has a certain predefined form such as the cross or square geometry or any other arrangement, and the location of the initial vector MV0 merely determined the position of such first search space. On the other hand, the present disclosure may also work with a first search space of which the size (in terms of positions pointed to by candidate MVs) and/or shape differ.

The first candidate motion vector MV0' with the lowest value of the cost function and the second candidate MV0'secondBest with the second lowest value are calculated and selected 302.

Based on the coordinates defining the position to which MV0' points and on the direction given by a line connecting the positions at which the first and the second candidate motion vectors MV0' and MV0'secondBest point, a region is selected to perform the construction of the second search space in the second stage 303 of FIG. 3.

More specifically, one candidate motion vector included in the second search space points to the position closest to the position of MV0' in the resolution of the second search space on a line connecting the positions of the first the second candidate motion vector which is not included in the first search space. One or more additional candidate motion vectors are included in the second search space which point to positions adjacent in the pixel resolution of the second search space and which are not included in the first search space.

Examples of search space configurations according to this second embodiment are shown in FIGS. 12 and 13. As an example, the pixel resolution of the second search space is the same as the pixel resolution of the first search space. As can be seen in the figures, the position to which the initial candidate motion vector points is surrounded by four pixel positions adjacent in the respective pixel resolution to MV0, i.e. four nearest neighbors. MV0 and the candidate motion vectors pointing to these four positions adjacent to MV0 are included in the first search space. The first and the second candidate motion vectors MV0' and MV0'secondBest with the lowest and second lowest cost of the first search space according to a cost function are determined. The position pointed at by MV0' and a direction of the line connecting MV0' and MV0'secondBest given by the difference vector MV0'diff is used to determine the second search space in the second stage 303 of FIG. 3. Here the definition of MV0'diff is the same as in the description of the first exemplary embodiment. In both FIGS. 12 and 13, the second search space includes a candidate motion vector pointing approximately to a position on the line connecting MV0' and MV0'secondBest which is given by (MV0'+MV0' diff) and the adjacent positions (i.e., nearest neighbors) to said position on said line which are not pointed to by candidate motion vectors of the first search space.

In FIG. 12, MV0' and MV0'secondBest are not adjacent in the resolution of the first search space; they are second nearest neighbors. The second search space includes vectors, namely the vector pointing to said position on said line and the four nearest neighbors of said position.

In FIG. 13, MV0' and MV0'secondBest point at adjacent positions in the resolution of the first search space. In this case, the position in the second search space on the line connecting MV0' and MV0'secondBest which is defined by (MV0'+MV0'diff) is a nearest neighbor of MV0'. The second search space then comprises the vector pointing at the position corresponding to (MV0'+MV0'diff) and the candidate motion vectors pointing at the three nearest neighbors of (MV0'+MV0'diff) which are not equal to MV0'. Accordingly, the second search space comprises four candidate motion vectors.

However, if MV0' and MV0'secondBest are neither nearest nor second nearest neighbors in the pixel resolution of the first search space, i.e. if there is one pixel position in the first search space between the pixel positions at which MV0' and MV0'secondBest respectively point, the same second search space/window may be determined as in the case shown in FIG. 13.

If the search coordinates indicated by the second search space are already included in the first search space, then the second search operation is not performed (terminated). This may be in particular the case if the matching template and/or cost function that is used in the first and second stages are identical. Yet as another alternative, matching template and/or cost function are different for the first and the second search steps, the second search operation can be performed. It is noted that the present disclosure regards the reduction of the size of the search space and in particular the reduction by setting the second search space based on the characteristics of the cost function development. Any template is applicable with the present disclosure, which may be the same or different for the respective partial search spaces such as the first search space and the second search space or further search spaces if the search space determination is cascaded in more than two stages.

According to the second exemplary embodiment, the substeps for calculating S1803 the costs of the candidate motion vectors of the first search space (of the second search space S1805) in the motion vector refinement shown in FIG. 18 may be carried out similarly to the calculation according to the first embodiment described above with respect to FIG. 19.

Third Exemplary Embodiment

In the embodiments described so far, the search space determining unit 310 shown in FIG. 3 identifies a first and second candidate motion vector from the first search space which are the candidate motion vectors of the first search space for which the matching costs are the lowest and the second lowest.

According to a third exemplary embodiment of the present disclosure, for the selection 302 of a first and second candidate motion vector, the template matching costs are computed for four candidate motion vectors pointing at positions around the starting position at which the initial estimate MV0 of the motion vector points. In particular, in order to determine the second search space, the matching costs of the pixel positions are evaluated which are adjacent in the pixel resolution of the first search space to the position pointed at by the estimate MV0 of the motion vector. A pixel position is determined to be pointed at by a first candidate motion vector of the second search space which is adjacent in the pixel resolution of the first search space to the positions pointed to by said first and second candidate motion vectors and different from the position pointed to by the estimate of the motion vector. This first candidate motion vector points onto a quadrant where the matching costs are expected to decrease, as shown in FIG. 14.

Figure 14:
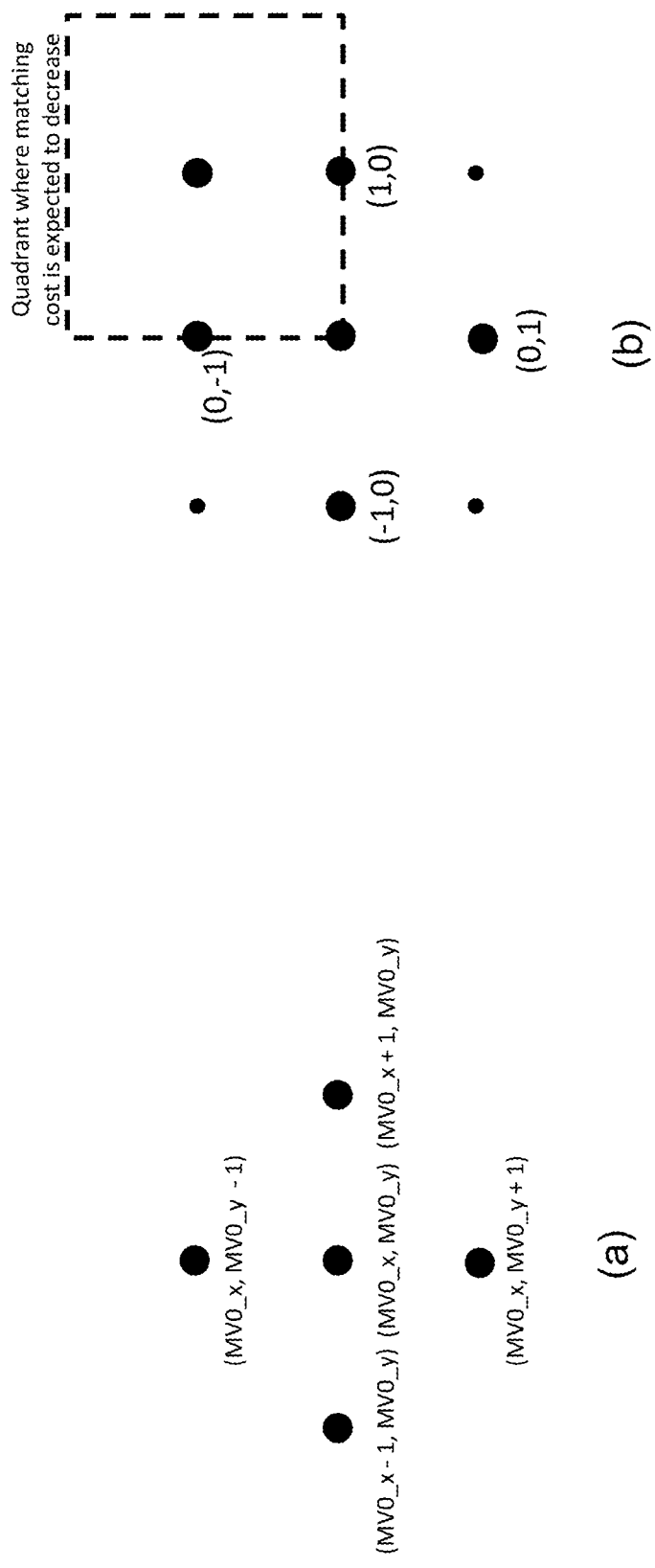
FIG. 14 is a schematic drawing illustrating the determination of the search space according to a third embodiment.
Figure 15:
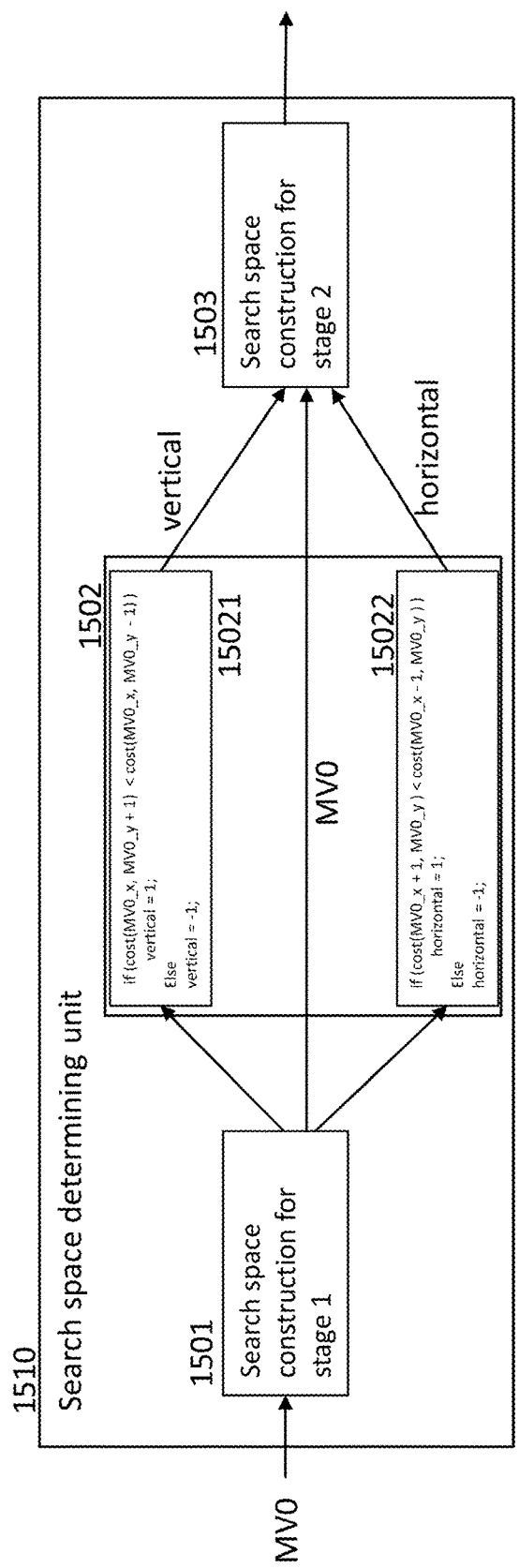
FIG. 15 is a block diagram of a search space determination unit according to the third embodiment.

In FIG. 15, a search space determination unit 1510 is shown which is a modification of the more generic search space determination unit 310 shown in FIG. 3. Based on the initial estimate MV0 of the motion vector, a first search space, which is exemplarily illustrated in FIG. 14(a) is determined in stage 1 of the search space construction 1501 of FIG. 15, the coordinates of the initial estimate for the motion vector are denoted as MV0_x and MV0_y. The first search space consists of MV0 and candidate motion vectors pointing at pixel positions around the position corresponding to MV0, e.g. the nearest neighbors of MV0 in the pixel resolution of the first search space. The matching costs are calculated for the candidate motion vectors of the first search space. By selecting a first and a second candidate motion vector 1501, two directions along preferably orthogonal directions (e.g., vertical and horizontal) are calculated in which the matching costs are expected to decrease.

In FIG. 14, as well as in the rest of the application where coordinates are considered, the positive direction of the horizontal axis ("x-axis") points to the right, whereas the positive direction ("y-axis") of the vertical axis points to the bottom.

More precisely, two comparisons 15021, 15022 are made, for which the points adjacent to the pixel position corresponding to MV0 are grouped into two groups. The matching costs of two pixel positions are compared which are adjacent in the pixel resolution of the first search space to the pixel position pointed at by the initial candidate motion vector and which have the same vertical component as the initial candidate motion vector. From the two compared vectors evaluated in this first comparison 15021, the vector with the lower matching costs is chosen as a first candidate motion vector of the first search space.

Also, the matching costs of two pixel positions are compared which are adjacent in the pixel resolution of the first search space to the pixel position pointed at by the initial candidate motion vector and which have the same horizontal component as the initial candidate motion vector. From the two compared vectors evaluated in this second comparison 15022, the vector with the lower matching costs is chosen as a second candidate motion vector of the first search space.

As a result of these two comparisons, a pixel position is determined to be pointed at by the first candidate motion vector of the second search space which has the same vertical component as the first candidate motion vector and which has the same horizontal component as the second candidate motion vector. The first and the second candidate motion vector respectively define a positive or negative half plane in vertical and horizontal direction. Their overlapping quadrant is selected as the area where the matching cost is expected to decrease, and defines second space. In FIG. 14(b), the second search space includes only one point.

The first search space may include the initial estimate MV0 of the motion vector and its nearest neighbors, i.e. the candidate motion vectors pointing at the pixel positions adjacent to MV0 in the resolution of the first search space. Such a search space configuration which has the "cross" geometry also described with respect to the second embodiment, is shown in FIG. 14(a). The matching costs according to the cost function which is used are calculated for these five candidate motion vectors of the search space. In the following, it is assumed without loss of generality that the coordinates of the pixel position at which the initial estimate MV0 of the motion vector point are (0,0). The two comparisons described above for determining the coordinates (horizontal, vertical) of the first motion vector of the second search space may then for example be performed according to the following proceeding:

vertical=−1, horizontal=−1;
if (cost of candidate motion vector (0,1)<cost of candidate motion vector (0,−1)) vertical=1;
if (cost of candidate motion vector (1,0)<cost of candidate motion vector (−1,0)) horizontal=1;

By determining a motion vector (vertical, horizontal) based on the proceeding given above or a similar proceeding, a quadrant is selected in which the matching cost is expected to decrease.

Accordingly, the quadrant to be used in the determination of the second search space (303 in FIG. 3) comprises candidates having coordinates (horizontal*x, vertical*y), x, y>0 and "horizontal" and "vertical" having the values determined by a proceeding as described above. This determination of the quadrant is exemplarily illustrated in FIG. 14(*b*). In the example shown, the motion vector (−1,1) is determined to define the selected quadrant (i.e. the top right quadrant). Potential motion vectors in the other three quadrants, which in this specific example will not be included in the second search space, are illustrated as smaller dots.

The present disclosure is not limited to the explicit definition of the above proceeding. For instance, (1,1) may be used as initial values instead of (−1,−1), or, instead of setting initial coordinates, "else"-clauses may be used (compare the if-else clauses 15021, 15022 in FIG. 15), the order (sequence) of the "if" conditionals may be exchanged.

When the first candidate motion vector of the second search space is determined as described above, its matching costs are calculated. As a specific case, the second search space may comprise only one said first candidate motion vector. In this case, out of the candidate motion vectors checked (in the described example, five candidate motion vectors of the first search space and one candidate motion vector of the second search space), the candidate motion vector with the lowest matching cost is selected as the motion vector to be used for the current block.

However, as a further at least one candidate motion vector of the second search space, a candidate motion vector pointing to a position in a resolution of the second search space may be determined. This at least one further candidate motion vector points to a position in a resolution of the second search space, which is located approximately on a line connecting the estimate of the motion vector and the candidate of the second search space. The pixel resolution of the second search space may be higher than the pixel resolution of the first search space. The further candidate motion vector of the second search space may to a position located between the positions pointed to by the first candidate motion vector of the second search space and the estimate of the motion vector.

In particular, after the first candidate motion vector of the determination of the second search space 1503 may be continued in a second stage of the determination of the second search space, and the second search space may then be determined to comprise at least one additional candidate motion vector pointing in a position in the quadrant that has been defined by the first candidate motion vector of the second search space. For instance, out of the candidates checked so far, the two candidates with the minimum and second minimum matching costs may be identified and used to calculate a direction for the determination of further points to which candidate motion vectors of the second search space point.

Figure 16:
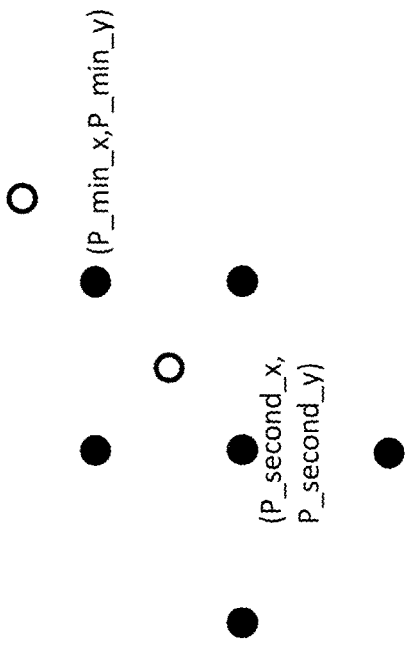
FIG. 16 is a schematic drawing of a search space configuration according to a combination of different embodiments.

An exemplary proceeding for the calculation of the direction calculated based on the candidates with the lowest and the second lowest matching costs will be given in the following, wherein the coordinates of the candidates with the lowest and second lowest matching costs are denoted as (P_min_x, P_min_y) and (P_second_x, P_second_y) and the variables "direction_vertical" and "direction_horizontal" denote the components of the vector defining said direction:

direction_vertical=0, direction_horizontal=0;
if (P_min_x !=P_second_x)
   direction_horizontal=1;
if (P_min_y !=P_second_y)
   direction_vertical=1;

As shown in FIG. 16, new candidate motion vectors for the second search space may be selected based on the direction given by the vector (direction_vertical,direction_horizontal) and the coordinates of the candidate motion vector (P_min_x,P_min_y) with the lowest matching costs as either 0.5×(P_min_x+direction_vertical,P_min_y−direction_horizontal) and 0.5×(P_min_x−vertical,P_min_y+horizontal) or one of these two points, depending on the pixel positions at which the first and the second candidate motion vector of the first search space point. The matching costs of the new candidate motion vectors of the second search space are calculated, and out of the candidate motion vectors of the first and second search, the candidate motion vector with the minimum matching cost is selected as output of the motion vector refinement process, i.e., MV0" of FIG. 3.

In FIG. 16 example, the second search space has a fractional pixel resolution, in particular half pixel resolution (in accordance with the coefficient 0.5 of the vectors specifying the direction for positions of the additional candidate motion vectors of the second search space). Alternative pixel resolutions such as quarter pixel resolution may be used, and instead of one or two motion vector candidates, two or four candidate motion vectors pointing approximately to the line given by the candidate motion vector (P_min_x, P_min_y) and the direction (direction_vertical, direction_horizontal) may be used.

In the exemplary search space configuration shown in FIG. 16, the first motion vector of the second search space coincides with the candidate motion vector (P_min_x, P_min_y) with the lowest matching costs on which the calculation of the additional motion vectors of the second search space, 0.5×(P_min_x+direction_vertical,P_min_y−direction_horizontal) and 0.5×(P_min_x−vertical,P_min_y+horizontal) is based.

Combinations of Embodiments

According to each of the exemplary embodiments described above, a second search space is selected based on the output of a first step in which a first search space is determined 301 and a first and second candidate motion vector are selected from the first search space 302. However, the overall search process can be split into more steps than the determination a first and a second search space and the selection of one or two candidates from the respective search space. In each step or substep, a new search space may be determined in accordance with one of the exemplary embodiments. For instance the search space configuration described above with respect to FIG. 16 is an example where, the determination of the second search space implies subsequently applying the third exemplary embodiment and the first exemplary embodiment. This will be explained in the following.

In the exemplary search space configuration shown in FIG. 16, the second search space comprises the first candidate motion vector of the second search space and two additional candidate motion vectors. These two additional candidate motion vectors of the second search space point approximately to pixel positions on a line defined by the pixel position candidate motion vector with the lowest matching cost among the five candidate motion vectors of the first search space and the second and by the line having a direction given by the vectors with the coordinates direction_horizontal and direction_vertical calculated according to the proceeding given above. This proceeding is an example for the calculation of two candidate motion vectors in accordance with a direction given by a line connecting two candidate motion vectors. This proceeding may also be used in the calculation of the second search space of the first embodiment that has been described above with reference to FIGS. 5 to 11.

In other words, the optional second stage of the determination of the second search space according to the third embodiment corresponds to the determination of the second search space according to the first embodiment. In other words, in the above example of determining a second search space having more candidate motion vectors than only the first candidate motion vector of the second search space, the additional motion vectors of the search space have been obtained by combining this third embodiment of the present disclosure with the first embodiment.

In the example of the third exemplary embodiment which has been described with reference to FIG. 16, the third embodiment and the first embodiments are combined when determining the second search space. However, the present disclosure is not limited to this particular example of a combination of different embodiments.

Further, the present disclosure is not limited to combining two different embodiments. Alternatively, the second search space may be determined by subsequently applying the second stage 303 according to the first embodiment and thus determining nested search spaces having different pixel resolutions, for example half pixel resolution first and quarter pixel resolution second.

Figure 17:
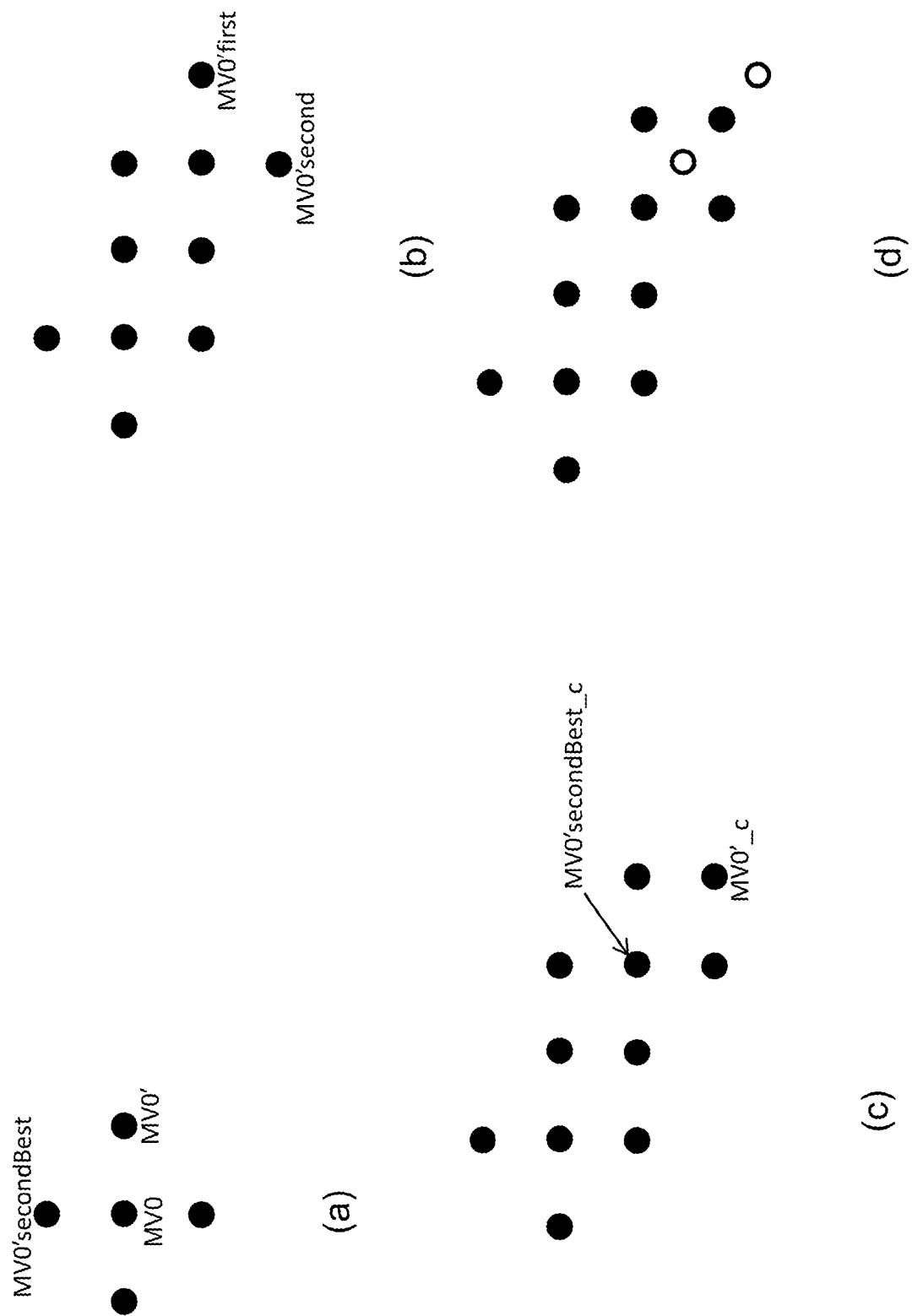
FIG. 17 is schematic drawing illustrating an exemplary determination of a search space by combining different embodiments.

A further example of combining the different exemplary embodiments is illustrated in FIG. 17. As can be seen in FIG. 17(a), a first search space comprising five candidate motion vectors, namely the initial estimate motion vector and the four candidate motion vectors adjacent to the initial estimate motion vector in the pixel resolution of the first search space (e.g., full pixel resolution), is determined in accordance with the second exemplary embodiment. The candidate motion vectors with the lowest and second lowest matching cost are used to determine a second search space which is a region in accordance with the second embodiment comprising further five candidate motion vectors shown in FIG. 17 (b). On these further five candidate motion vectors, the approach of the third embodiment is applied, i.e. an additional candidate motion vector shown in FIG. 17(c) is determined, by applying the selection 1502 of a first and a second candidate motion vector, MV0'first and MV0'second, of FIG. 15. In accordance with the first embodiment, again, the two candidate motion vectors with the lowest and the second lowest matching costs are determined (denotes MV0'c and MV0' secondBest_c in the figure). As can be seen in FIG. 17(d) two additional candidate motion vectors pointing to pixel positions of a higher pixel resolution (for example half pixel resolution) than the resolution used so far, are added, which point approximately to positions on a line connecting the positions corresponding to MV0'c and MV0' secondBest_c.

An advantage of combining different embodiments is that the number of candidate motion vectors can be kept low while maintaining similar accuracy in an increased area of the reference picture. For instance, as can be seen in FIG. 17, the catenation of the three stages corresponding to the three embodiments allows for providing a position of a predictor in the accuracy half pixel resolution for an area corresponding to a square of 7×7 full pixels.

The motion vector determination including the motion vector refinement as described above can be implemented as a part of encoding and/or decoding of a video signal (motion picture). However, the motion vector determination may also be used for other purposes in image processing such as movement detection, movement analysis, or the like.

The motion vector determination may be implemented as an apparatus. Such apparatus may be a combination of a software and hardware. For example, the motion vector determination may be performed by a chip such as a general purpose processor, or a digital signal processor (DSP), or a field programmable gate array (FPGA), or the like. However, the present disclosure is not limited to implementation on a programmable hardware. It may be implemented on an application-specific integrated circuit (ASIC) or by a combination of the above mentioned hardware components.

The motion vector determination may also be implemented by program instructions stored on a computer readable medium. The program, when executed, causes the computer to perform the steps of obtaining an estimate of the motion vector, determining the first search space including a plurality of candidate motion vectors based on the estimate, identifying a first and a second candidate motion vectors in the first search space according to a cost function, determining a second search space including one or more candidate motion vectors based on the first and the second candidate motion vectors, and selecting the motion vector for the current block from among the candidate motion vectors of the first space and the second space. The computer readable medium can be any medium on which the program is stored such as a DVD, CD, USB (flash) drive, hard disc, server storage available via a network, etc. The encoder and/or decoder may be implemented in various devices including a TV set, set top box, PC, tablet, smartphone, or the like. It may be a software, app implementing the method steps.

Summarizing, the present disclosure relates to the construction of a search space for determining a motion vector for a current block of a picture in a video sequence. The search space construction is split into in two main stages, wherein a first and a second partial search space are respectively determined. Based on an initial estimate of a motion vector, a first search space is first constructed. A first and a second candidate motion of the first search space are identified according to a cost function. Based on the first and the second candidate motion vectors, a second search space is constructed. The motion vector for the current block is selected from the candidate motion vectors of the first search space and the second search space.

Although the disclosure has been described above mainly within the framework of motion picture video coding, the proposed techniques can be applied as well for coding (i.e. encoding or decoding) of any picture set comprising two or more pictures. The picture set may comprise, for example, a set of still pictures obtained in a medical imaging application, e.g., a sequence of computed tomography (CT) scan images. In the appended claims, the term "video" may therefore mean a motion picture sequence or any other picture set that comprises two or more pictures.

What is claimed is:

1. An apparatus for determining a motion vector for a current block of a video frame to be used in inter-prediction of the current block, the apparatus comprising:
  a search space determining unit configured to obtain an estimate of the motion vector, determine a first search space comprising a plurality of candidate motion vectors based on the estimate of the motion vector, select a first candidate motion vector and a second candidate motion vector in the first search space according to a cost function, and determine a second search space based on the first candidate motion vector and the second candidate motion vector, wherein the second search space comprises one or more candidate motion vectors having a fractional pixel resolution; and a motion vector selecting unit configured to select the motion vector for the current block from among the candidate motion vectors of the first search space and the second search space.

2. The apparatus according to claim 1, wherein the cost function is based on a predetermined template and indicates, for a respective candidate motion vector, a level of similarity between the predetermined template and a predictor pointed to by the respective candidate motion vector.

3. The apparatus according to claim 1, wherein the search space determining unit is configured to determine a size and/or a position of the second search space in accordance with a direction of a line connecting the first candidate motion vector and the second candidate motion vector.

4. The apparatus according to claim 3, wherein the determining of the first search space by the search space determining unit comprises:
setting the first search space to have an integer pixel resolution,
and wherein the determining of the second search space by the search space determining unit comprises:
including in the second search space one or more candidate motion vectors that point to positions located in the direction of the line connecting the first candidate motion vector and the second candidate motion vector.

5. The apparatus according to claim 4, wherein at least one of the candidate motion vectors of the second search space points to a position between positions pointed to by the first candidate motion vector and the second candidate motion vector.

6. The apparatus according to claim 1, wherein the search space determining unit is configured to determine a location of a region including at least two positions to which at least two candidate motion vectors point, respectively, said at least two positions being adjacent in a pixel resolution of the second search space, and to determine the second search space as positions of the region that do not belong to the first search space.

7. The apparatus according to claim 1, wherein the determining of the first search space by the search space determining unit comprises:
including in the first search space the estimate of the motion vector and candidate motion vectors pointing to positions in a pixel resolution of the first search space adjacent to a position pointed to by said estimate of the motion vector.

8. The apparatus according to claim 7, wherein the search space determining unit is configured to:
select, as a first candidate motion vector of the second search space, a candidate motion vector pointing to a position in the pixel resolution of the first search space that is adjacent to the positions pointed to by the first candidate motion vector and the second candidate motion vector identified in the first search space and different from the position pointed to by the estimate of the motion vector.

9. The apparatus according to claim 8, wherein the search space determining unit is configured to determine, as a second candidate motion vector of the second search space, a candidate motion vector pointing to a position in a resolution of the second search space, wherein the position pointed to by the second candidate motion vector of the second search space is located approximately on a line connecting the estimate of the motion vector and the first candidate motion vector of the second search space, the pixel resolution of the second search space being higher than the pixel resolution of the first search space.

10. The apparatus according to claim 9, wherein the second candidate motion vector of the second search space points to a position located between positions pointed to by the first candidate motion vector of the second search space and the estimate of the motion vector.

11. The apparatus according to claim 1, wherein the second search space has a higher resolution than the first search space.

12. The apparatus according to claim 1, further comprising:
a motion vector determining unit for determining the estimate of the motion vector from a list of motion vectors including motion vectors of at least one block adjacent to the current block.

13. A video decoder for decoding a plurality of pictures from a bitstream, comprising:
a bitstream parser for obtaining, from the bitstream, an indication of the estimate of the motion vector,
an inter-prediction unit including the apparatus according to claim 1 and further configured to determine a prediction block based on the motion vector for the current block, and
a reconstruction unit configured to reconstruct the current block based on the prediction block.

14. A video encoder for encoding a plurality of pictures into a bitstream, comprising:
an inter-prediction unit including the apparatus according to claim 1 and further configured to determine a prediction block corresponding to the motion vector for the current block,
a bitstream former configured to include an indication of the estimate of the motion vector into the bitstream, and
a reconstruction unit configured to generate a reconstructed block based on the prediction block and store the reconstructed block in a memory.

15. A method for determining a motion vector for a current block of a video frame to be used in inter-prediction of the current block, the method comprising:
obtaining an estimate of the motion vector,
determining a first search space comprising a plurality of candidate motion vectors based on the estimate of the motion vector,
selecting a first candidate motion vector and a second candidate motion vector in the first search space according to a cost function,
determining a second search space based on the first candidate motion vector and the second candidate motion vector, the second search space comprising one or more candidate motion vectors having a fractional pixel resolution; and
selecting the motion vector for the current block from among the candidate motion vectors of the first search space and the second search space.

16. A non-transitory computer-readable medium comprising instructions that, when executed by a processor, cause the method of claim 15 to be performed.

* * * * *